(12) United States Patent
Cunningham et al.

(10) Patent No.: US 11,150,131 B2
(45) Date of Patent: Oct. 19, 2021

(54) MOBILE BIOSENSING INSTRUMENT CAPABLE OF MULTIPLE DETECTION MODALITIES

(71) Applicant: THE BOARD OF TRUSTEES OF THE UNIVERSITY OF ILLINOIS, Urbana, IL (US)

(72) Inventors: Brian T. Cunningham, Champaign, IL (US); Kenneth D. Long, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 16/651,608

(22) PCT Filed: Sep. 28, 2018

(86) PCT No.: PCT/US2018/053277
§ 371 (c)(1),
(2) Date: Mar. 27, 2020

(87) PCT Pub. No.: WO2019/067822
PCT Pub. Date: Apr. 4, 2019

(65) Prior Publication Data
US 2020/0300697 A1 Sep. 24, 2020

Related U.S. Application Data

(60) Provisional application No. 62/565,013, filed on Sep. 28, 2017.

(51) Int. Cl.
*G01J 3/02* (2006.01)
*G01N 21/31* (2006.01)
(Continued)

(52) U.S. Cl.
CPC .......... *G01J 3/0218* (2013.01); *G01J 3/0272* (2013.01); *G01J 3/0291* (2013.01); *G01N 21/31* (2013.01);
(Continued)

(58) Field of Classification Search
CPC .......... G01J 3/00; G01J 3/0218; G01J 3/0272; G01J 3/0291; G01J 3/28;
(Continued)

(56) References Cited

U.S. PATENT DOCUMENTS 6,947,629 B2 * 9/2005 Chu ...................... G02B 6/359
385/17
8,143,599 B2 3/2012 Feng et al.
(Continued)

FOREIGN PATENT DOCUMENTS

WO 2001/96923 12/2001

OTHER PUBLICATIONS

The International Search Report (ISR) with Written Opinion for PCT/US2018/053277 dated Nov. 8, 2018, pp. 1-24.
(Continued)

*Primary Examiner* — Hina F Ayub
(74) *Attorney, Agent, or Firm* — McDonnell Boehnen Hulbert & Berghoff LLP

(57) ABSTRACT

A smartphone is optically coupled to an apparatus that can operate in multiple modes to perform transmission, reflectance, intensity, or scattered light spectroscopy on a sample provided, in an appropriately configured sample cartridge. The apparatus includes a first illumination optical path for illuminating the sample, with light from a light source, on the smartphone for transmission, reflectance, and scattered light spectroscopy. The apparatus also includes a second illumination optical path for illuminating the sample with light from a laser diode for intensity spectroscopy. The
(Continued)

apparatus further includes a collection optical path for collecting light from the sample in each of the modes. An image sensor on the smartphone receives the collected light via a diffraction grating to obtain a spectrum image. The first illumination optical path is substantially parallel to the collection optical path, whereas the second illumination optical path is substantially orthogonal to the collection path.

30 Claims, 23 Drawing Sheets

(51) Int. Cl.
    *G01N 21/64*      (2006.01)
    *G01N 21/84*      (2006.01)
    *G01N 21/78*      (2006.01)
    *G01J 3/00*      (2006.01)
    *G01J 3/28*      (2006.01)

(52) U.S. Cl.
    CPC ... *G01N 21/645* (2013.01); *G01N 2021/6484* (2013.01); *G01N 2201/08* (2013.01)

(58) Field of Classification Search
    CPC .......... G01N 2021/6484; G01N 21/31; G01N 21/645; G01N 21/78; G01N 21/8483; G01N 2201/0221; G01N 2201/08
    See application file for complete search history.

(56) References Cited

U.S. PATENT DOCUMENTS

| | | | |
|---|---|---|---|
| 8,947,656 | B2 | 2/2015 | Cunningham |
| 10,324,023 | B1* | 6/2019 | Scheeline ................. G01J 3/18 |
| 2002/0024653 | A1* | 2/2002 | Jung ....................... G01J 3/513 |
| | | | 356/73 |
| 2005/0264815 | A1* | 12/2005 | Wechsler ............... G01N 21/03 |
| | | | 356/440 |
| 2014/0193839 | A1* | 7/2014 | Cunningham ........ G01J 3/0264 |
| | | | 435/7.92 |
| 2014/0268127 | A1 | 9/2014 | Day |
| 2016/0033328 | A1 | 2/2016 | Walters |

OTHER PUBLICATIONS

Extended European Search Report, dated May 25, 2021 for European Patent Application No. 18863142.8.

Long, Kenneth D., et al., "Multimode smartphone biosensing: the transmission, reflection, and intensity spectral (TRI)-analyzer", Lab on a Chip, Jul. 24, 2017.

Cunningham, Brian T., et al., "Mobile biosensing using the sensing capabilities of smartphone cameras", 2017 IEEE MTT-S International Microwave Workshop Series On Advanced Materials and Processes for RF and THZ Applications (IMWS-AMP), IEEE, Sep. 20, 2017.

Scherr, Rachel E., et al., "Innovative Techniques for Evaluating Behavioral Nutrition Interventions", Advances in Nutrition, Jan. 11, 2017.

* cited by examiner

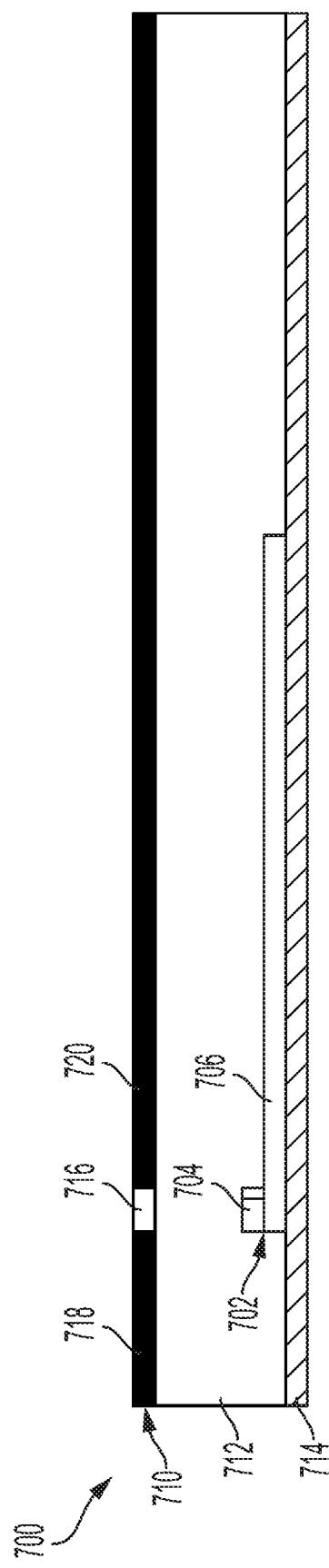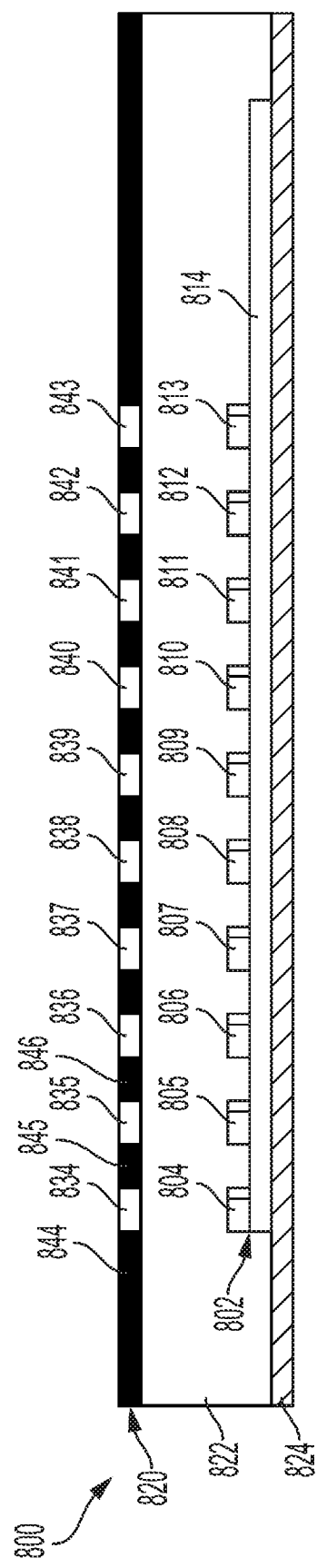

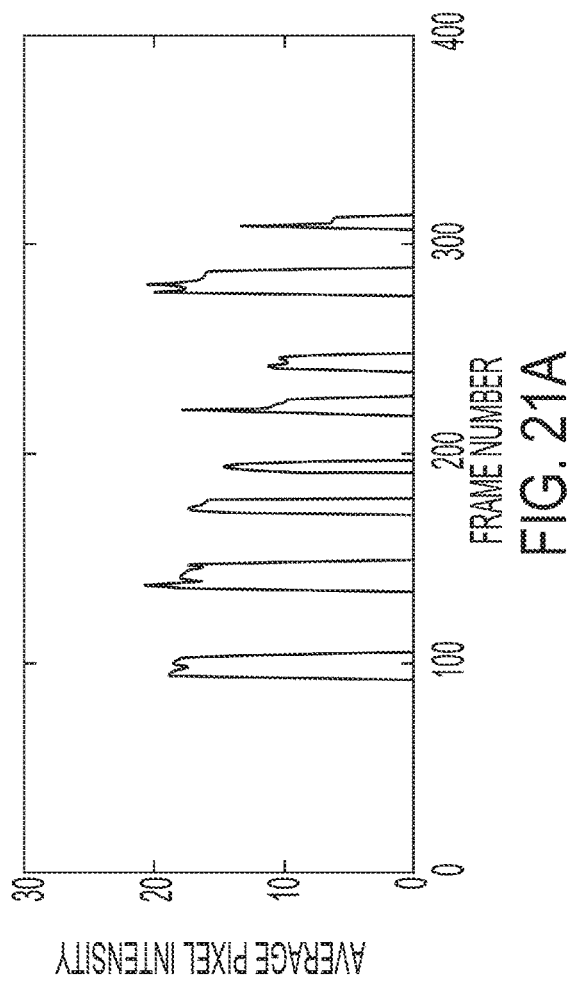
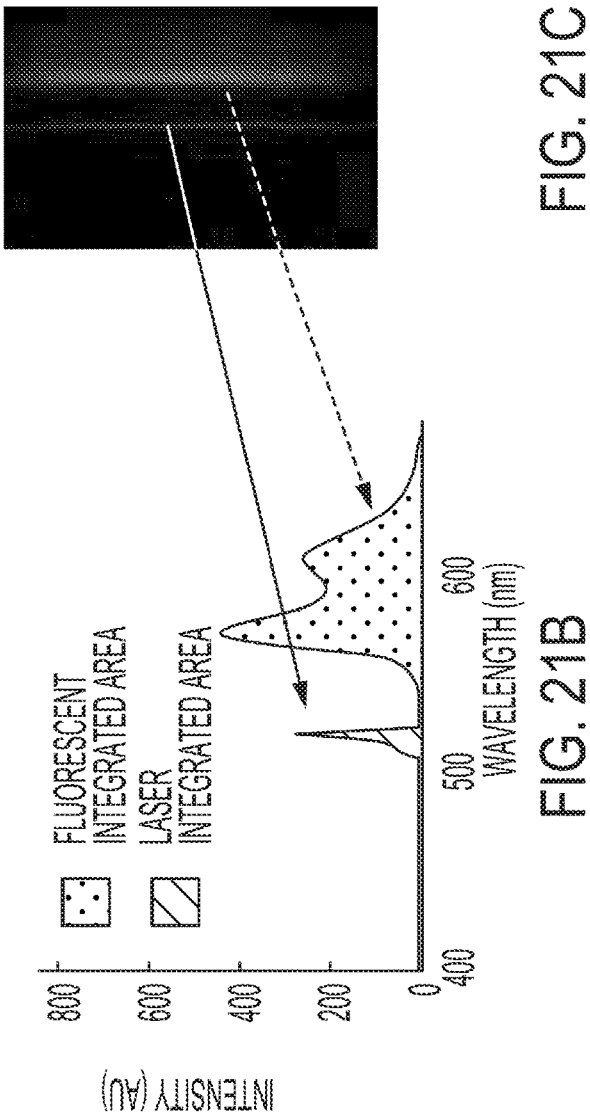
FIG. 21A
FIG. 21B
FIG. 21C

MOBILE BIOSENSING INSTRUMENT CAPABLE OF MULTIPLE DETECTION MODALITIES

CROSS-REFERENCE TO RELATED APPLICATIONS

This application is a national stage application under 35 U.S.C. § 371 of International Application No. PCT/US2018/053277, filed Sep. 28, 2018, which claims priority under 35 U.S.C. § 119(e) to U.S. Provisional Application No. 62/565,013 filed Sep. 28, 2017, the disclosures of each of which are explicitly incorporated by reference herein.

STATEMENT REGARDING FEDERALLY SPONSORED RESEARCH

This invention was made, at least in part, with United States governmental support awarded by the National Science Foundation under CBET 12-64377. The United States Government has certain rights in this invention.

BACKGROUND

Since the introduction of smartphones in 2004, interest in coupling them with wearable devices for monitoring health-related metrics has grown and has the potential to develop into an over $15 billion/year market, focused mainly upon reporting physiological parameters such as heart rate and blood pressure. While the market for such consumer products does not classify the vast majority these sensors as medical devices, there is intense interest in transitioning additional health diagnostics, particularly in vitro diagnostic (IVD) tests on bodily fluids from the laboratory to the point-of-care (POC). Tests that can be facilitated through test-specific cartridges that interface with a readout instrument or paper-based assays that can be interpreted by visual inspection have obtained regulatory approval that facilitates their use in POC settings.

As smartphones continue to include greater computational power and more sophisticated imaging sensors that complement their capabilities for wireless communication and internet connectivity, the interface between IVD testing and mobile devices offers a powerful new POC testing paradigm. The output of nearly all of the most common laboratory-based diagnostic tests can be sensed using a smartphone with sensitivity that rivals that of conventional laboratory-based benchtop instruments. Examples include smartphone-based microscopy, fluorimetry, Enzyme Linked ImmunoSorbent Assay (ELISA), Polymerase Chain Reaction (PCR), and lateral flow assays. Smartphone-based biosensing has been the subject of recent reviews. See L. Kwon, K. D. Long, Y. Wan, H. Yu and B. T. Cunningham, Biotechnology Advances, 2016, 34, 291-304 and D. Zhang and Q. Liu, Biosens. Bioelectron., 2016, 75, 273-284.

Typically, however, smartphone-based IVD detection instruments are capable of carrying out only a single type of analysis and are capable of only limited multiplexing of tests. The capability for a laboratory-based microplate reader to function as a "multi-mode" instrument has been long recognized as a desirable characteristic that enables a single system to transition between spectrometric absorption analysis (as used in ELISA assays), fluorometric analysis (as used in molecular beacon assays, fluorescent polarization (FP) assays, and luminescence-based assays), and, in the case of one product (PerkinElmer EnSight) label-free optical biosensor assays. The ability of a detection system to easily transition between these modalities would beneficially enable the user to purchase only one instrument, and to use a common liquid handling format and software interface across a variety of applications.

SUMMARY

In a first aspect, example embodiments provide an apparatus comprising: a structural support comprising a mount and a cartridge slot, wherein the mount is configured to removably mount a mobile computing device in a working position, wherein the mobile computing device includes a first light source and an image sensor, and wherein the cartridge slot is configured to receive a plurality of different types of sample cartridges; a wavelength-dispersive element coupled to the structural support such that the wavelength-dispersive element is optically coupled to the image sensor when the mobile computing device is in the working position; a first optical fiber having a proximal end and a distal end, wherein the first optical fiber is coupled to the structural support such that the proximal end of the first optical fiber is optically coupled to the cartridge slot via a first illumination optical path and the distal end of the first optical fiber is able to receive light from the first light source when the mobile computing device is in the working position; a second optical fiber having a proximal end and a distal end, wherein the second optical fiber is coupled to the structural support such that the proximal end of the second optical fiber is optically coupled to the cartridge slot via a collection optical path that is substantially parallel to the first illumination optical path and the distal end of the second optical fiber is able to direct light to the image sensor via the wavelength-dispersive element when the mobile computing device is in the working position; and a second light source coupled to the structural support such that the second light source is optically coupled to the cartridge slot via a second illumination optical path, wherein the second illumination optical path is substantially orthogonal to the collection optical path. The apparatus is operable in at least a transmission spectroscopy mode, a reflection spectroscopy mode, an intensity spectroscopy mode, and a scattered light spectroscopy mode.

In a second aspect, example embodiments provide a method comprising: mounting a mobile computing device to an apparatus, wherein the mobile computing device includes a light source and an image sensor, and wherein mounting the mobile computing device to the apparatus comprises optically coupling the light source to a distal end of a first optical fiber in the apparatus and optically coupling the image sensor to a wavelength-dispersive element in the apparatus, wherein the wavelength-dispersive element is optically coupled to a distal end of a second optical fiber in the apparatus; inserting a sample cartridge into a cartridge slot of the apparatus, wherein a sample is disposed in the sample cartridge, wherein the cartridge slot comprises a reflective slot surface, and wherein the cartridge slot is (i) optically coupled to a proximal end of the first optical fiber via a first illumination optical path, (ii) optically coupled to a proximal end of the second optical fiber via a collection optical path that is substantially parallel to the first illumination optical path, and (iii) optically coupled to a second light source via a second illumination optical path that is substantially orthogonal to the collection optical path; selecting a mode of operation from among at least a transmission spectroscopy mode, a reflection spectroscopy mode, an intensity spectroscopy mode, and a scattered light spectroscopy mode; directing incident light into the sample disposed in the sample cartridge, wherein the incident light is from at least one of the first light source or the second light source, depending on the selected mode of operation; collecting, by an optical system, light from the sample disposed in the sample cartridge, wherein the optical system couples the collected light into the proximal end of the second optical fiber; receiving at the wavelength-dispersive element, via the second optical fiber, the light collected by the optical system, wherein the wavelength-dispersive element disperses the received light into spatially-separated wavelength components on the image sensor, and using the image sensor to obtain at least one image comprising the spatially-separated wavelength components.

In a third aspect, example embodiments provide a mobile computing device comprising: a first light source; an image sensor; a user interface; a processor; data storage; and program instructions stored in the memory and executable by the processor to cause the mobile computing device to perform operations. The operations include: receiving, via the user interface, an input indicative of a selected spectroscopy mode from among at least a transmission spectroscopy mode, a reflectance spectroscopy mode, an intensity spectroscopy mode, and a scattered light spectroscopy mode; while the image sensor is optically coupled to a wavelength-dispersive element of an apparatus, using the image sensor to obtain at least one image of light from the wavelength-dispersive element, wherein the at least one image includes one or more spatially-separated wavelength components indicative of a sample disposed in a sample cartridge that is optically coupled to the wavelength-dispersive element; and processing the at least one image in accordance with the selected spectroscopy mode.

BRIEF DESCRIPTION OF THE DRAWINGS

FIG. 11 is a cross-sectional view of a sample cartridge configured for scattered light spectroscopy and containing a single-reagent test strip, in accordance with an example embodiment.

FIG. 12 is a cross-sectional view of a sample cartridge configured for scattered light spectroscopy and containing a single-reagent test strip, in accordance with an example embodiment.

FIG. 21A illustrates pixel intensity as a function of frame number for an example video capture of a phenylalanine assay obtained using the system shown in FIG. 1A in the intensity spectroscopy mode.

FIG. 218 is an example spectrum that includes a peak corresponding to the excitation light and a double-peak corresponding to the fluorescence light for the phenylalanine assay of FIG. 21A.

FIG. 21C is a spectrum image corresponding to the data shown in FIG. 21B and obtained from the video capture illustrated in FIG. 21A.

DETAILED DESCRIPTION

1. Overview

Figure 1A:
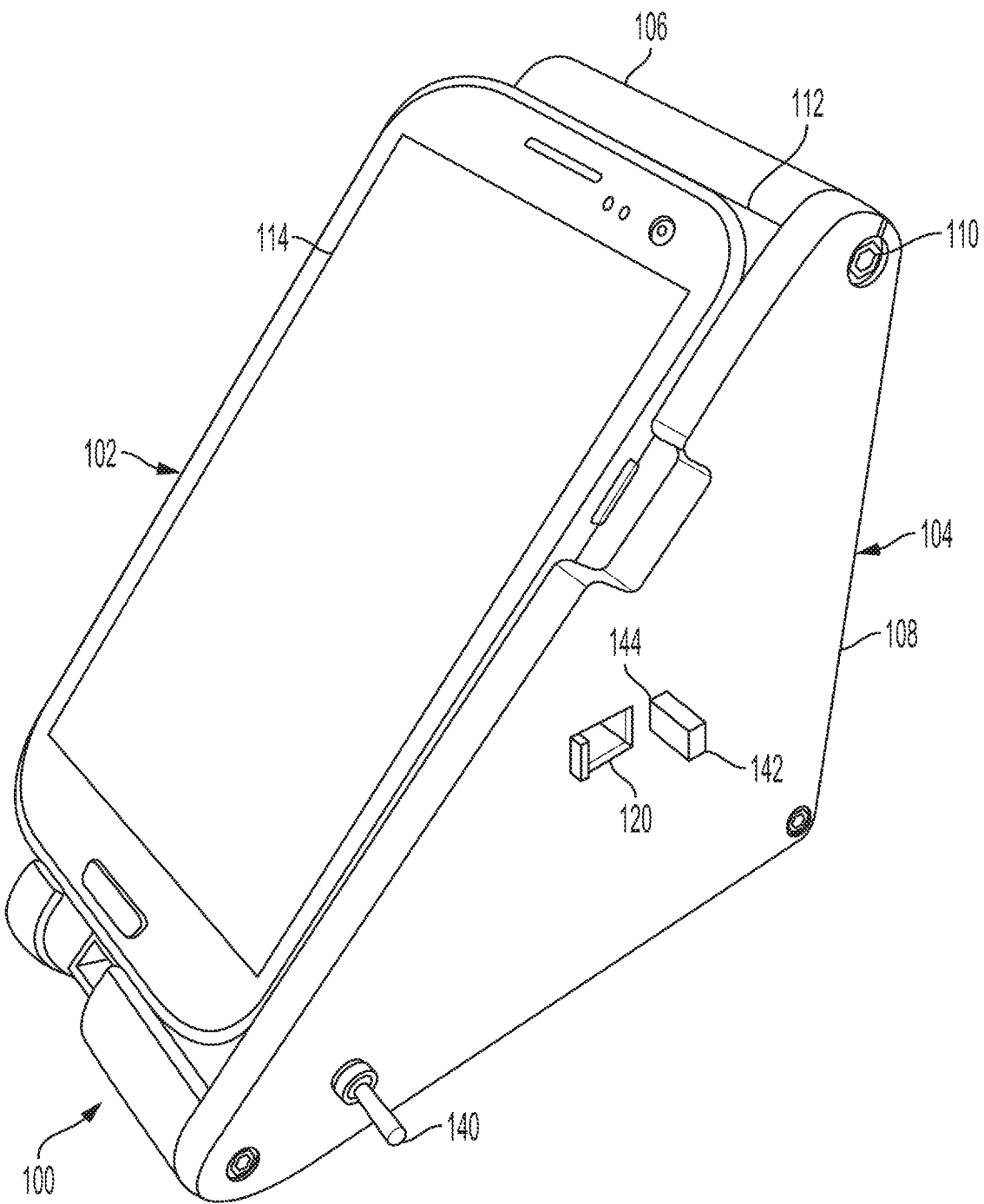
FIG. 1A is a view of a system that includes an apparatus with a smartphone coupled thereto, in accordance with an example embodiment.

Disclosed herein is a smartphone-based system that can operate in multiple spectral modalities. In an example implementation, the system can operate in four different modes to perform four different types of spectroscopy: transmission spectroscopy; reflectance spectroscopy; intensity spectroscopy; and scattered light spectroscopy. The mode can be selected by the smartphone, and the smartphone can also be used to collect and analyze the data.

In the transmission spectroscopy mode, the transmission of light through a sample is measured at one or more wavelength(s). By comparing the transmission of light through the sample at those wavelength(s) to the transmission of light through a blank or other reference at those wavelength(s), the absorption of light at those wavelength(s) attributable to the sample can be determined. This measurement modality is commonly used in ELISA assays, liquid phase plasmonic nanoparticle-based tests including surface plasmon resonance (SPR) and localized surface plasmon resonance (LSPR), latex (or other nanoparticle-based) agglutination tests (LAT), and transmissive surface-based SPR, LSPR, and photonic crystal based tests. Notably, ELISA tests are a mainstay of contemporary biosensing tests, with ready-to-go kits available for thousands of different biological targets.

In the reflectance spectroscopy mode, the reflectance of light of a reflector exposed to a sample is measured. For example, the reflector could be a photonic crystal (PC), and the resonantly reflected wavelength resulting from the sample binding to the PC could be measured. Photonic crystal biosensors are described in U.S. Pat. Nos. 7,479,404, 7,521,769, 7,531,786, 7,737,392, 7,742,662, and 7,968,836, which patents are incorporated herein by reference. Other reflective label-free optical biosensing techniques, such as SPR or reflectometric interference spectroscopy (RIFS), can also be used. While these direct binding label-free approaches do not currently have commercially available assay kits associated with them, they have been applied to thousands of biological analytes due to their simplicity and speed.

In the intensity spectroscopy mode, the intensity, polarization, and/or wavelengths of light generated from within the sample, for example, by fluorescence, chemiluminescence, bioluminescence or quantum-dot (QD) emission is measured. A broad variety of biosensing assays make use of such measurements, including fluorescence or chemiluminescent immunoassays (FIA, CLIA), fluorescent polarization (FP), Forster resonance energy transfer (FRET) as well as several molecular diagnostics, including polymerase chain reaction (PCR) and related loop-mediated isothermal amplification (LAMP).

In the scattered light spectroscopy mode, the intensity of light scattered from an object is measured at multiple wavelengths. This mode can be useful to perform measurements of colorimetric assays that may be embodied in, for example, paper-based test strips. Such test strips are available for assaying ketones, glucose, pH, and other analytes in urine. Semi-quantitative results can be obtained by a human user visually comparing the color of a reagent pad exposed to the sample with a series of reference colors. However, by measuring the spectrum of light scattered from the test strip, results can be obtained automatically and more reliably.

In example embodiments, the smartphone-based system includes a smartphone (or other mobile computing device) that is programmed with software that supports the different modes of operation, a "cradle" apparatus to which the smartphone is optically coupled, and a sample cartridge inserted into a slot in the apparatus. The apparatus provides two different optical paths for illuminating the inserted sample cartridge. In the transmission, reflectance, and scattered light modes, light from a first light source (e.g., a white light LED on the smartphone) can be directed to the inserted sample cartridge via a first illumination optical path. In the intensity mode, light from a second light source (e.g., a laser diode housed within the apparatus) can be directed to the inserted sample cartridge via a second illumination optical path. The apparatus also provides a collection optical path through which light from the inserted sample cartridge is collected. The collected light is directed to a wavelength-dispersive element (e.g., a diffraction grating) that is optically coupled to an image sensor (e.g., camera) on the smartphone. As a result, different wavelengths are received at different locations (pixels) on the image sensor. Once calibrated, the pixels of the image sensor can be correlated to wavelengths.

Different types of sample cartridges can be used for different modes. The different types of sample cartridges can have different configurations (e.g., with regard to which portions are opaque, transparent, or reflective) based on the optical paths that are used for the different modes, but with the same overall form factor. In example embodiments, the first illumination optical path is substantially parallel to the collection optical path and the second illumination optical path is substantially orthogonal to the collection optical path. Thus, sample cartridges for the transmission, reflection, and scattered light modes can be configured to use the substantially parallel first illumination and collection optical paths, whereas sample cartridges for the intensity mode can be configured to use the substantially orthogonal second illumination and collection optical paths.

Sample cartridges used for the transmission mode can have a transparent front surface, a transparent back surface opposite the transparent front surface, and a sample chamber between the front and back surfaces. Light from the first illumination optical path enters the sample chamber through the transparent front surface, passes through the sample in the sample chamber, passes through the transparent back surface, and is then reflected by a reflective surface (e.g., a mirror) in the cartridge slot. The reflected light enters the sample chamber through the transparent back surface, passes through the sample disposed in the sample chamber, passes through the transparent front surface, and is collected via the collection optical path.

Sample cartridges for the reflection mode can have a transparent front surface, a reflective back surface opposite the transparent front surface, and a sample chamber between the front and back surfaces. The reflective back surface could be, for example, a PC biosensor that acts as a wavelength-selective resonant mirror. Light from the first illumination optical path enters the sample chamber through the transparent front surface, passes through the sample in the sample chamber, and is reflected by the reflective back surface. The reflected light passes through the sample chamber, passes through the transparent front surface, and is collected via the collection optical path.

Sample cartridges for the intensity mode can have a transparent front surface, a transparent back surface opposite the transparent back surface, a transparent bottom surface orthogonal to the transparent front surface, and a sample chamber between the front and back surfaces. Light from the second illumination optical path enters the sample chamber through transparent bottom surface, passes through the sample in the sample chamber, and causes fluorophores present in the sample to emit fluorescence light. A portion of the fluorescence light passes through the transparent front surface and is collected via the collection optical path.

Sample cartridges for the scattered light mode can have a front surface with a transparent window, a transparent back surface, and a space between the front and back surfaces that encloses a test strip that includes one or more sample pads exposed to one or more samples. Light from the first illumination optical path enters through the window and illuminates the sample pad. Light scattered from the sample pad, which indicates the color of the sample pad exposed to the sample, passes through the window, and is collected via the collection optical path.

For many clinically relevant assays, multiple test samples, replicates, positive/negative controls, and/or standard calibration solutions are used. To facilitate such assays, a sample cartridge can include multiple sample chambers, for example, arranged as a linear array of sample chambers. Different test samples, replicates, controls, calibration solutions, etc. may be placed in different sample chambers in the linear array. Multiplexing can be achieved by sliding the sample cartridge through the cartridge so that each sample chamber in the linear array sequentially passes through the illumination and collection optical paths. By pairing this linear motion with the smartphone's ability to capture video, the spatial dimension separating the sample chambers in the cartridge can be reconstituted with video post-processing, allowing for the rapid and user-friendly measurement of multiple samples with a single motion, similar to swiping the magnetic strip of a credit card across a magnetic read head. For example, the user can "swipe" the sample cartridge through the cartridge slot while the smartphone records video at 60 frames/second. Software on the smartphone can identify the frames from the video that represent images gathered while the center of each sample chamber is aligned with the collection optical path.

2. Example Smartphone-Based System

Figure 1B:
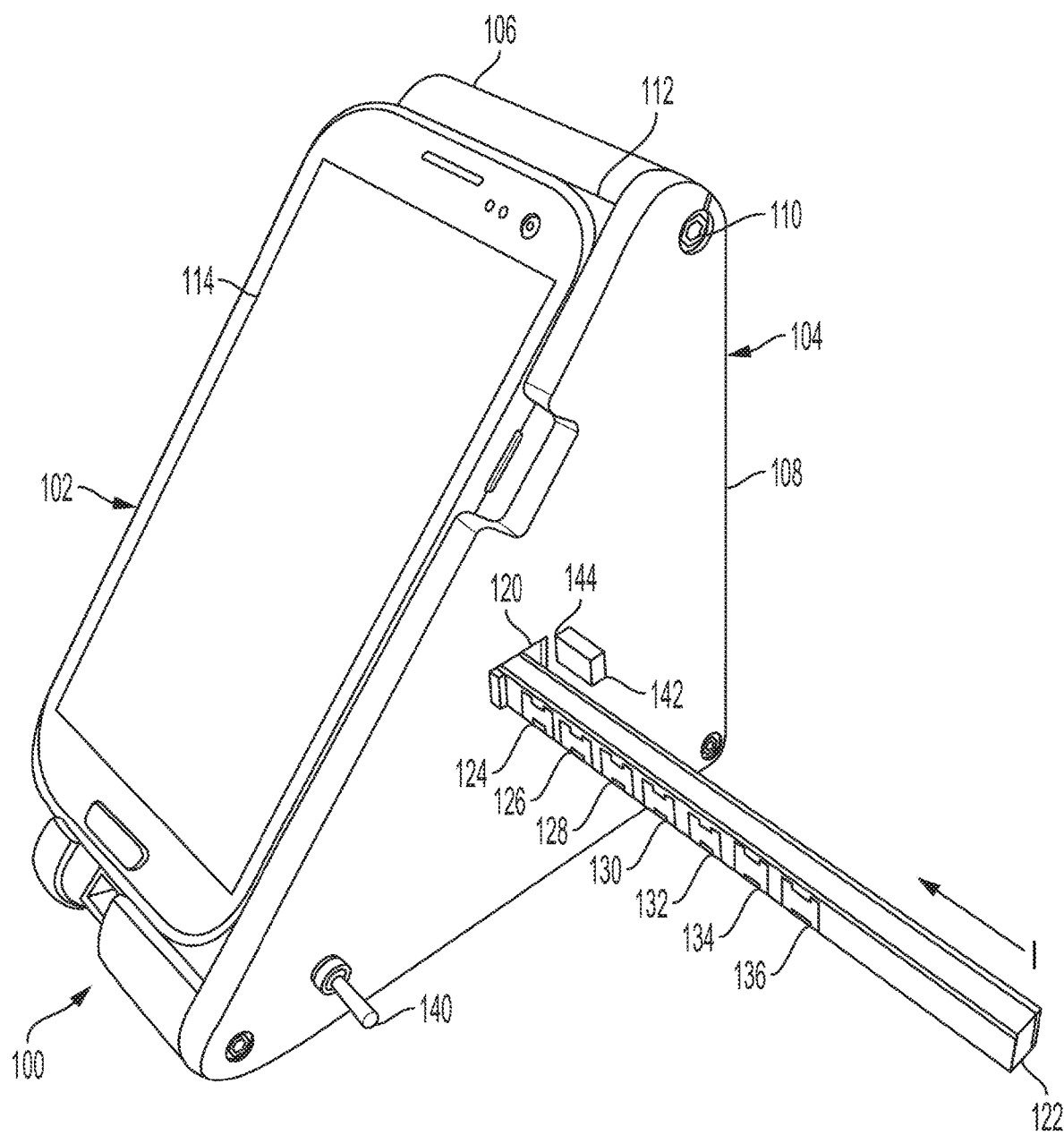
FIG. 1B is a view of the system shown in FIG. 1A with a sample cartridge into a cartridge slot of the apparatus, in accordance with an example embodiment.

FIGS. 1A and 1B illustrate an example system 100 that includes a smartphone 102 mounted to and optically coupled to a cradle apparatus 104. In this example, the cradle apparatus 104 includes a housing 106 and a side plate 108 that is fastened to the housing 106 via bolts 110. The smartphone 102 can be removably mounted to the apparatus 104 by sliding it into a mounting slot 112 in the housing 106 from the left until the smartphone 102 is abutted against side plate 108 to achieve a working position. In this working position, the display/touchscreen 114 on the front side of the smartphone 102 is facing outward and accessible to the user. The back side (not shown) of the smartphone 102 includes an image sensor (e.g., rear-facing camera) and a light source (e.g., a white light LED), which are optically coupled to optical components housed within the apparatus 104 when the smartphone 102 is mounted to the apparatus 104 in the working position as shown in FIGS. 1A and 1B. In this working position, the light source on the smartphone 110 is optically coupled to the first illumination optical path and the image sensor on the smartphone 110 is optically coupled to the collection optical path, as described in more detail below. The smartphone 110 can be removed from the apparatus 104 by sliding it through the mounting slot 112 toward the left.

As shown in FIG. 1A, the side plate 108 includes a cartridge slot 120 into which a plurality of different types of sample cartridges can be inserted. For example, sample cartridges configured for the transmission mode, sample cartridges configured for the reflectance mode, sample cartridges configured for the intensity mode, and sample cartridges configured for the scattered light mode can all be received into cartridge slot 120. FIG. 1B shows the cartridge slot 120 with an example sample cartridge 122 inserted therein. In this example, the sample cartridge 122 includes a plurality of sample chambers arranged in a linear array. The plurality of sample chambers are exemplified by sample chambers 124-136 shown in FIG. 1B. Although seven sample chambers are shown in this example, it is to be understood that a sample cartridge could include a greater or fewer number of sample chambers. The sample cartridge 122 can be inserted into the cartridge slot 120 by moving the sample cartridge 122 in an insertion direction, which is indicated in FIG. 1B by the arrow labeled "I." By moving the cartridge sample 122 in the insertion direction, each of the sample chambers can pass through the collection optical path for measurement. The measurement can involve the image sensor on the back side of smartphone 102 capturing video frames of the light collected via the collection optical path as the cartridge sample 122 is moving in the insertion direction. The apparatus 104 can also include an exit slot (not shown) that is on the left side of the apparatus 104 and aligned with the cartridge slot 120. With this arrangement, the sample cartridge 122 can enter the apparatus 104 through the cartridge slot 120 on the right side and exit the apparatus 104 through the exit slot on the left side.

FIGS. 1A and 1B also show a toggle switch 140 and a slider 142 disposed on the side plate 108. The toggle switch 140 can be used to turn an internal light source (e.g., a laser diode) within the apparatus 104 on and off. This internal light source is optically coupled to the second illumination optical path, as described in more detail below. The slider 142 is slidably mounted within a slot 144 on the side plate 108 and a corresponding slot (not shown) on the left side of the apparatus 104. The slider can be used to move a lens into and out of the collection optical path, as described in more detail below.

Figure 1C:
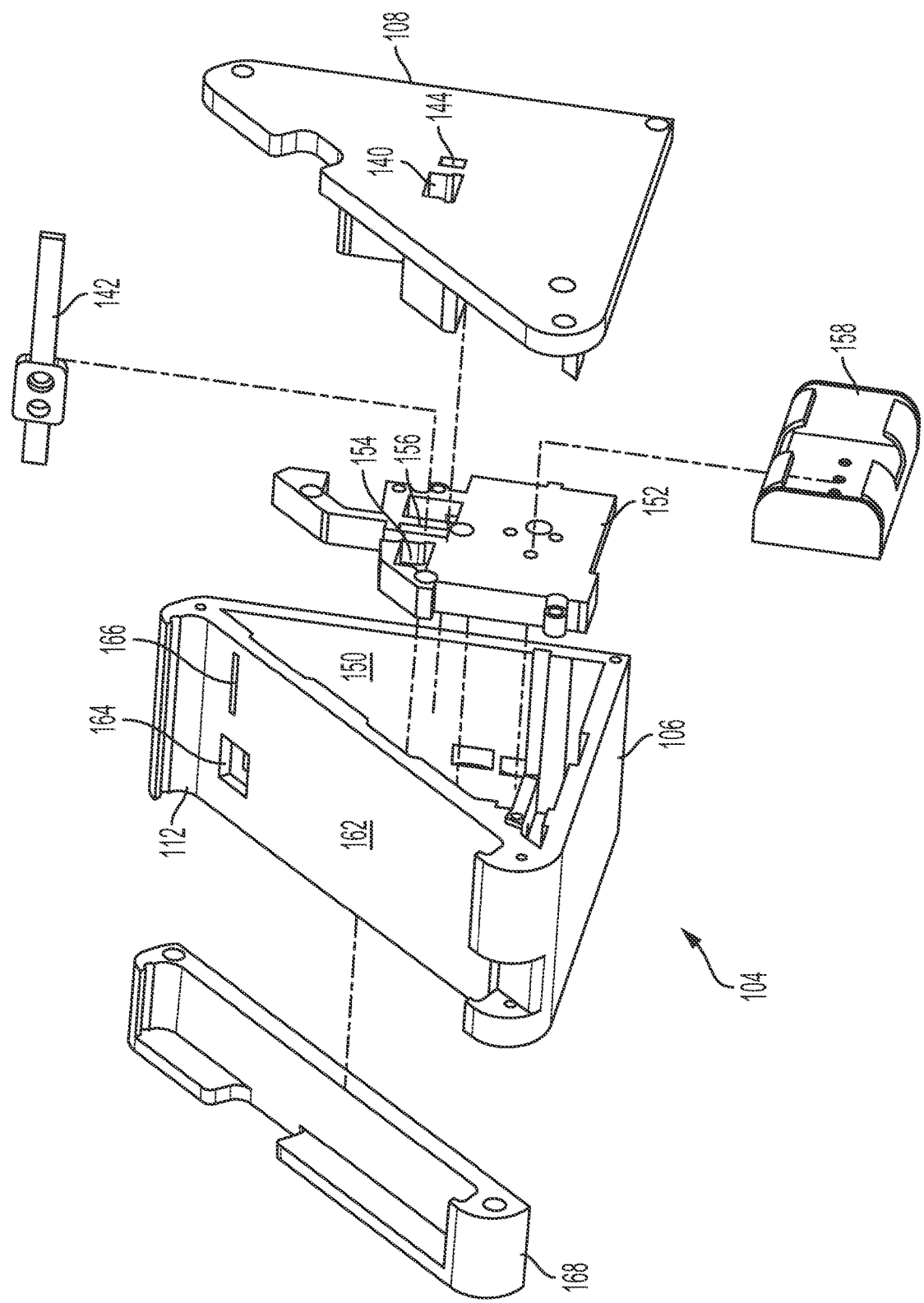
FIG. 1C is an exploded view of the apparatus shown in FIG. 1A, in accordance with an example embodiment.

FIG. 1C is an exploded view of the cradle apparatus 104 shown in FIGS. 1A and 1B but with the smartphone 110 removed. In FIG. 1C, the housing 106 is shown separated from the side plate 108 FIG. 1C also shows that housing 106 includes an internal space 150 in which an internal support 152 is disposed. Housing 106, side plate 108, and internal support 152 together function as a structural support for the smartphone 110 and for the optical components with the apparatus 106, as described in more detail below.

Internal support 152 includes a cartridge slot 154 that is aligned with cartridge slot 140 in side plate 108. When a sample cartridge is inserted through slots 140 and 154 such that a sample chamber in the sample cartridge is centered within the slot 154, then that sample chamber will be aligned with an illumination optical path and the collection optical path for measurement. Internal support 152 also includes a slot 156 that is aligned with slot 144 in side plate 108. Slider 142 is slidably mounted within slots 144 and 156. A battery casing 158 can be fastened to the internal support 152 to house a plurality of batteries (e.g., three AAA size 1.5 volt batteries) that are used to power the internal light source (e.g., laser diode).

FIG. 1C shows that mounting slot 112 includes a mounting surface 162 that supports the back side of smartphone 110 when the smartphone 110 is mounted to the apparatus 104 in the working position. As shown, mounting surface includes an opening 164 and a slot 166. When apparatus 104 is assembled, a diffraction grating (or other wavelength-dispersive element) is disposed in the opening 164 so as to be adjacent to and optically coupled to the image sensor on the back side of the smartphone 110, when the smartphone 110 is mounted in the working position. Slot 166 accommodates the distal end of an optical fiber such that the optical fiber is optically coupled to the light source on the back side of smartphone 110 and can direct light from the light source to the first illumination optical path.

FIG. 1C also shows a side support 168 (not shown in FIGS. 1A and 1B) that can be fastened to the left side of housing 106 after the smartphone 110 has been inserted into the mounted slot 112 from the left. When fastened in this way, side support 168 can securely hold the smartphone 110 in the working position, so that the smartphone 110 does not move out of alignment if the apparatus 104 is moved, jostled, or otherwise disturbed.

In example embodiments, some or all of the components shown in FIG. 1C (housing 106, side plate 108, internal support 152, etc.) can be made of plastic and fabrication using a 3-D printing process. It is to be understood, however, that other materials and fabrication methods could be used.

Figure 2:
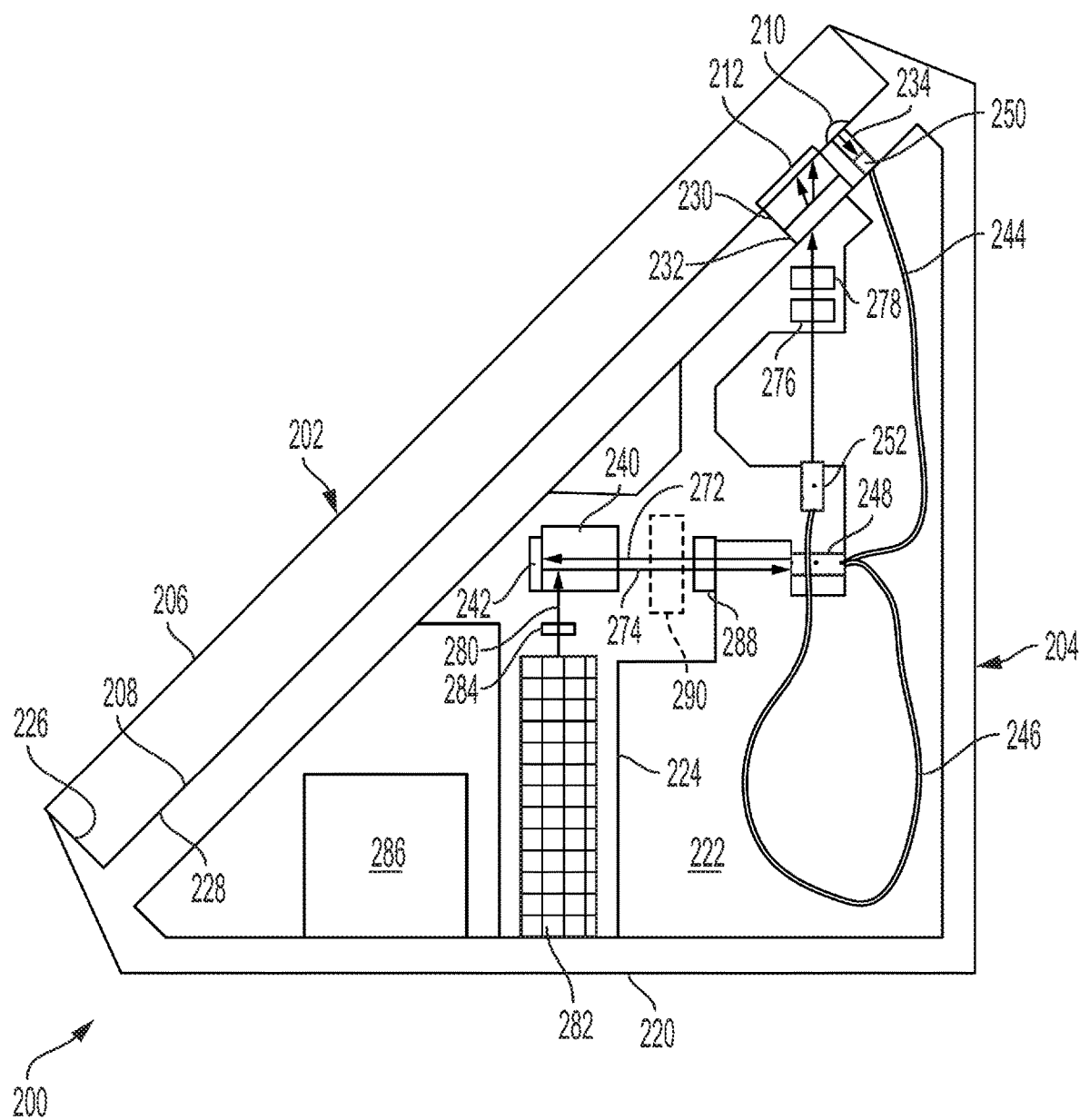
FIG. 2 is a cross-sectional view of a system that includes an apparatus with a smartphone coupled thereto, in accordance with an example embodiment.

FIG. 2 is a cross-sectional view of an example system 200 that includes a smartphone 202 mounted to and optically coupled to an apparatus 204. Smartphone 202 can be similar to similar to smartphone 102 shown in FIGS. 1A and 1B. Thus, smartphone 202 can include a front surface 206 that includes a display/touchscreen and a back surface 208 opposite the front surface 206. The back surface 208 can include a light source 210 and an image sensor 212. The image sensor 212 could be part of a camera that can be operated to capture still images and/or video images. For example, the image sensor 212 could be a CCD or other light sensor having a two-dimensional array of pixels. The camera may further include a lens or other optics (not shown) to form an image on the image sensor 212. The light source 210 could be a white light LED or other light source that can "flash" or otherwise illuminate a scene that is being imaged by the image sensor 212.

Apparatus 204 can be similar to apparatus 104 shown in FIGS. 1A-1C. Thus, apparatus 204 can include a housing 220 with an internal space 222. Apparatus 204 can further include an internal support 224 disposed within the internal space 222 and coupled to the housing 220. The housing 220 also includes a mount for the smartphone 202 that includes a mounting slot 226 and a mounting surface 228. The mounting surface 228 includes an opening 230 in which a diffraction grating 232 is disposed. The mounting surface 228 also includes an opening 234 through which light from the light source 210 is able to enter the apparatus 204. When smartphone 202 is mounted to the apparatus 204 in the working position, smartphone 202 is disposed within the mounting slot 226 with back surface 208 against the mounting surface 228. In this working position, the image sensor 212 is positioned over the opening 230 and optically coupled to diffraction grating 232, and the light source 210 is positioned over the opening 234. The housing 204 together with the internal support 224 provide a structural support for the smartphone 202 and the various optical components within the apparatus, as described below.

Internal support 224 includes a cartridge slot 240 into which a sample cartridge (e.g., sample cartridge 122) can be inserted. Cartridge slot 240 has a reflective surface 242 (e.g., a mirror). Internal support 224 also supports various components that can direct light into cartridge slot 240 and collect light from cartridge slot 240. In this regard, a first optical fiber 244 and a second optical fiber 246 are mounted to the internal support via a bifurcated fiber assembly 248. The first optical fiber 244 has a proximal end within the bifurcated fiber assembly 248 and a distal end that is mounted within the opening 234 via a ferrule 250. With this arrangement, the distal end of the first optical fiber 244 is optically coupled to the light source 210 when the smartphone 202 is in the working position. The second optical fiber 246 has a proximal end within the bifurcated fiber assembly 248 and a distal end that this mounted to the internal support 224 via a ferrule 252. In this mounting position, the distal end of the second optical fiber 246 is optically coupled to the image sensor 212 via the diffraction grating 232.

Figure 3:
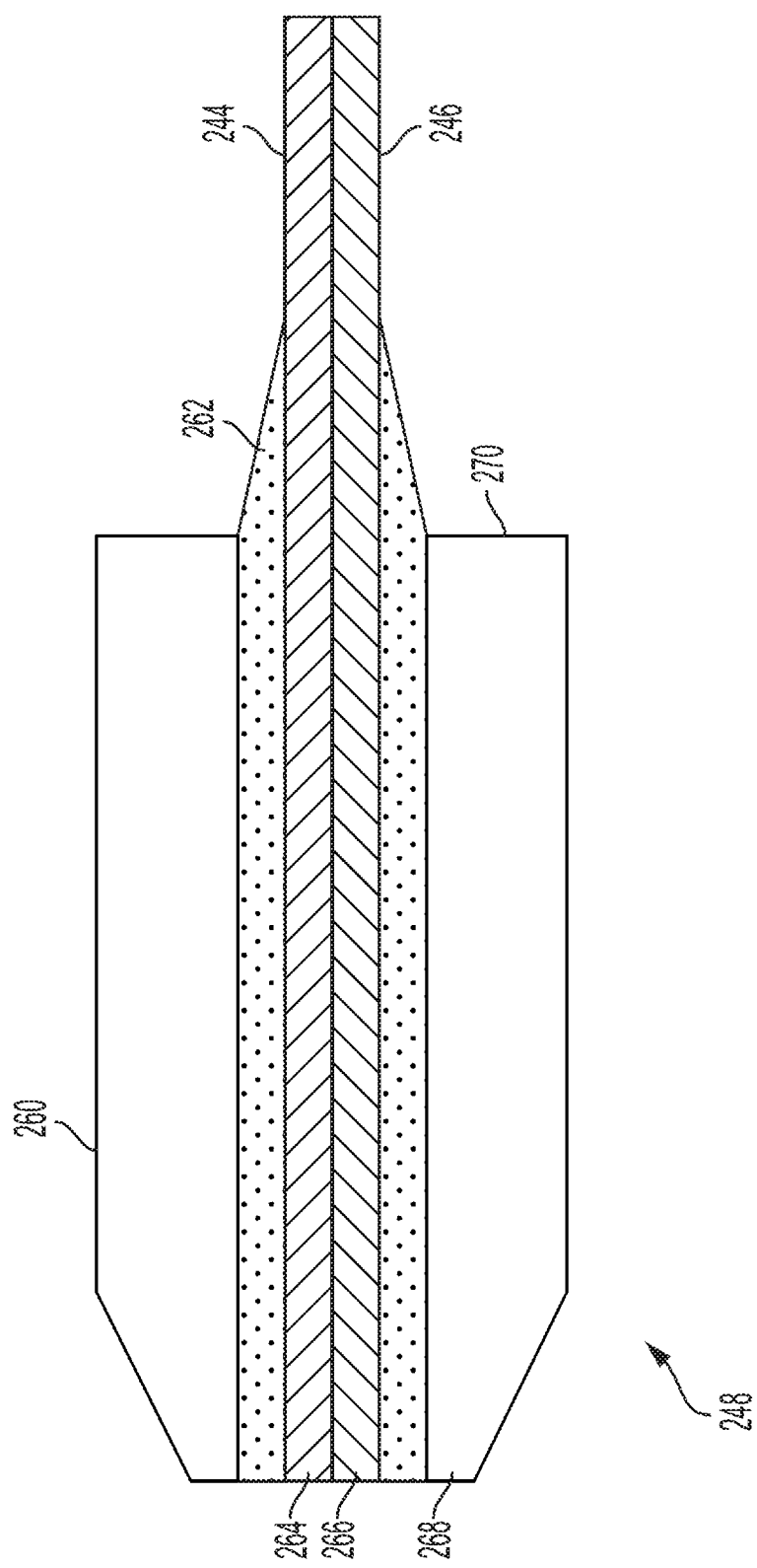
FIG. 3 is a cross-sectional view of the bifurcated fiber assembly shown in FIG. 2, in accordance with an example embodiment.

FIG. 3 is a cross-sectional view of the bifurcated fiber assembly 248. In this example, the bifurcated fiber assembly 248 includes a glass capillary 260 within which the first optical fiber 244 and the second optical fiber 246 are securely positioned by an epoxy bead 262. Within the glass capillary 260, the optical fibers 244 and 246 are positioned parallel to each other and adjacent to each other. The epoxy bead 262 surrounds the optical fibers 244 and 246 fills in the space between the optical fibers and the glass capillary 260. The bifurcated fiber assembly 248 has a proximal end 268 and a distal end 270. As shown, the proximal end 268 is narrower than the distal end 270 as a result of a beveled portion of the glass capillary 260. The proximal end 264 of the first optical fiber 244 and the proximal end 266 of the second optical fiber 246 are positioned at the proximal end 268 of the bifurcated fiber assembly 248. The proximal end 268 of the bifurcated fiber assembly 248 can be optically polished such that the proximal ends 264 and 266 of the optical fibers are flush with the proximal end 268 of the bifurcated fiber assembly 248. The optical fibers 244 and 246 and a portion of the epoxy bead 262 extend out of the distal end 270 of the bifurcated fiber assembly 248.

In an example embodiment, optical fibers 244 and 246 are multimode optical fibers with a silica core, a doped silica cladding, and a polyimide coating that provides an outer diameter of about 125 µm (e.g., Polymicro Technologies part number FVP100110125). Thus, with optical fibers 244 and 246 adjacent to one another in the bifurcated fiber assembly 248, the distance between the center points of the proximal ends 264 and 266 could be about 125 µm. It is also possible for optical fibers 244 and 246 to be separated by a small layer of epoxy, preferably less than 100 µm of epoxy and more preferably less than 10 µm. In this example embodiment, the glass capillary has an outer diameter of about 1.8 mm, an inner diameter of 0.128 mm, and a length of about 7 mm. It is to be understood that the dimensions and materials set forth above for the optical fibers 244 and 246 and the glass capillary 260 are exemplary only. Other dimensions and materials could be used. For example, instead of a glass capillary, other structures could be used as an alignment sleeve within which the optical fibers 244 and 246 are positioned so as to be substantially parallel to and adjacent to one another.

Turning again to FIG. 2, the bifurcated fiber assembly 248 provides a first illumination optical path 272 and a collection optical path 274. The first illumination optical path 272 extends from the proximal end 264 of the first optical fiber 244 into the cartridge slot 240. The collection optical path 274 extends from the cartridge slot 240 to the proximal end 266 of the second optical fiber 246. With this arrangement, light from light source 210 on the smartphone 202 can enter the distal end of the first optical fiber 244 (as indicated by the arrow shown in opening 234), travel through the first optical fiber 244, exit through the proximal end 264, and reach the cartridge slot via the first illumination optical path 272. Further, light from the cartridge slot 240 can travel through the collection optical path 274 so as to be collected by the second optical fiber 246 through its proximal end 266. The collected light then travels through the second optical fiber 246 and is emitted out of its distal end toward the diffraction grating 232 (as indicated by the arrow extending from ferrule 252 to diffraction grating 232).

The light emitted out of the distal end of the second optical fiber 246 is collimated by an aspheric lens 276, and the collimated light is then focused in the non-spectral dimension (perpendicular to the spectral dimension of the diffraction grating 232) by a cylindrical lens 278. The light focused by cylindrical lens 278 reaches diffraction grating 232, which disperses the light in the spectral dimension such that different wavelengths are received on the image sensor 212 at different locations. The two arrows shown between the diffraction grating 232 and the image sensor 212 are intended to illustrate two different wavelengths that are diffracted by the diffraction grating 232 in different directions so as to be received on the image sensor 212 at different locations. In one example, the diffraction grating 232 is a 1200 lines/mm transmission grating (Edmund Optics 49-578), the aspheric lens has a focal length of 19 mm, and the cylindrical lens has a focal length of 9 mm.

The first illumination optical path 272 and the collection optical path 274 are substantially parallel to each other. In one example, the angle between the first illumination optical path 272 and the collection optical path 274 is less than 5 degrees, preferably less than 2 degrees, and most preferably less than 1 degree.

Apparatus 204 also provides a second illumination optical path 280 that extends into the cartridge slot 242. Light from an internal light source 282 can reach the cartridge slot 242 via the second illumination optical path 280. The internal light source 282 can include, for example, a laser diode and associated optics that collimates the light from the laser diode. In one example, the laser diode emits light with a peak wavelength at about 532 nm and a power level of about 10 mW. A lens 284 mounted to the internal support 224 can focus the collimated light from the internal light source 282 to provide a focal region within the cartridge slot 240. In one example, the lens 284 is a piano-convex lens with a focal length of 8 mm. The internal light source 282 can be disposed within the internal space 222 (e.g., mounted to the internal support 224).

The second illumination optical path 280 is substantially orthogonal to (i.e., about 90 degrees from) the collection optical path 274. In one example, the angle between the second illumination optical path 280 and the collection optical path 274 differs from 90 degrees by less than 5 degrees, preferably by less than 2 degrees, and most preferably less than 1 degree.

The internal light source 282 can be powered by batteries (e.g., three AAA batteries) in a battery casing disposed in apparatus 204 (e.g., like battery casing 158 shown in FIG. 1C). The batteries can power the internal light source 282 via a power circuit 286 that is disposed in the apparatus. The power circuit 286 is configured to regulate the current through the laser diode in the internal light source 282 so as to provide a uniform intensity of the light emitted from the internal light source 282. In one example, the power circuit 286 includes a TPS61165 white LED driver available from Texas Instruments. The power circuit 286 is electrically coupled to a switch (e.g., like toggle switch 140 shown in FIGS. 1A and 1B) that enables the user to turn the internal light source 282 on and off.

In the transmission spectroscopy mode, the reflectance spectroscopy mode, and the scattered light spectroscopy mode, light from the light source 210 is used to illuminate a sample cartridge placed in the cartridge slot 240 via the first illumination optical path 272. The light from the light source 210 emerges from the proximal end 264 of the first optical fiber 244 and is collimated by a lens 288 that is mounted to the internal support 224. Lens 288 is positioned such that the first illumination optical path 272 and the collection optical path 274 both extend through the lens 288. Preferably, the collection optical path 274 is at the optical axis of the lens 288 and the first illumination path is slightly above the optical axis of lens 288. Light from the sample cartridge placed in the cartridge slot 240 is collected via the collection optical path 272, and the collected light is focused onto the proximal end 266 of the second optical fiber 246 by lens 288.

An additional lens 290 can also be placed in the collection optical path 274. The additional lens 290 is not used in the transmission spectroscopy mode or the reflectance spectroscopy mode but is used in the intensity spectroscopy mode and the scattered light spectroscopy mode, as described below. The additional lens 290 is mounted on a slider (e.g., slider 142 shown in FIG. 1A-1C), so that that additional lens 290 can be moved into the collection optical path 274 to collect light when operating in the intensity spectroscopy mode or the scattered light spectroscopy mode and moved out of the collection optical path 274 when operating in the transmission spectroscopy mode or the reflectance spectroscopy mode.

In the intensity spectroscopy mode, the sample cartridge in the cartridge slot 240 is illuminated using light from the internal light source 282 instead of the light source 210 on the smartphone 202, and the illumination occurs via the second illumination optical path 280 instead of the first illumination optical path 272. As noted above, lens 284 focuses the light from the internal light source 282 to a focal region within the cartridge slot 240. Light from this focal region (e.g., fluorescence light emitted from fluorophores in response to the light from the internal light source 282) is collected via the collection optical path 274, with both lens 288 and additional lens 290 positioned in the collection optical path 274. Lens 290 has a focus corresponds to the focal region within the cartridge slot 240 and collimates the light collected from the focal region. Lens 288 receives the collimated light and focuses the collimated light onto the proximal end 266 of the second optical fiber 246.

It is to be understood that the descriptions given above for FIGS. 1A, 1B, 1C, 2, and 3 are exemplary only, as other structures, elements, configurations, etc. could be used and are contemplated herein. For example, while the above description refers to a smartphone being coupled to the apparatus, it is to be understood that the apparatus could be configured to receive other types of mobile computing devices, such as tablet computers. Other variations are possible as well.

3. Example Sample Cartridges

FIGS. 4, 5, 6, and 7 illustrate the use of different sample cartridges for transmission spectroscopy, reflectance spectroscopy, intensity spectroscopy, and scattered light spectroscopy, respectively, when inserted into the cartridge slot 240 of apparatus 204 shown in FIG. 2.

Figure 4:
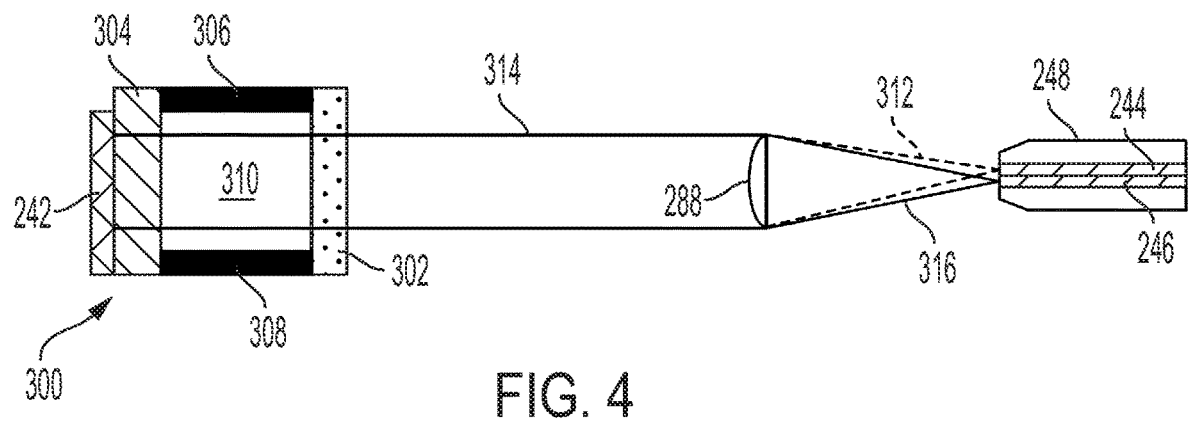
FIG. 4 is a schematic view of a sample cartridge configured for transmission spectroscopy being used in the apparatus shown in FIG. 2, in accordance with an example embodiment.

FIG. 4 shows a cross-section view of an example sample cartridge 300 configured for the transmission spectroscopy mode. In this example, sample cartridge 300 has a transparent front surface 302, a transparent back surface 304, an opaque top surface 306, and an opaque bottom surface 308, all of which define an internal sample chamber 310 that contains a sample. The transparent back surface 304 covers the reflective surface 242 in the cartridge slot 240.

For the transmission spectroscopy mode, lens 288 (but not lens 290) is positioned in the first illumination optical path and the collection optical path between the sample cartridge 300 and the bifurcated fiber assembly 248, as shown in FIG. 4. Light 312 is emitted from the proximal end of first optical fiber 244 (light 312 is indicated by the dotted lines in FIG. 4) toward the lens 288. Lens 288 collimates the emitted light 312 to provide incident collimated light 314 directed toward the sample cartridge 300. The incident collimated light 314 enters the sample chamber 310 through the transparent front surface 302, passes through the sample chamber 310, then passes through the transparent back surface 304, and is reflected by the reflected surface 242 as reflected collimated light 314. The reflected collimated light 314 enters the sample chamber 310 through transparent back surface 304, passes through the sample chamber 310, emerges from the sample cartridge 300 through the transparent front surface 302, and reaches the lens 288. Lens 288 focuses the reflected collimated light 314 onto the proximal end of the second optical fiber 246 as collected light 316. In FIG. 4, the reference number 314 indicates both the incident collimated light and the reflected collimated light as the incident collimated beam and the reflected beam collimated beam are nearly coincident.

Figure 5:
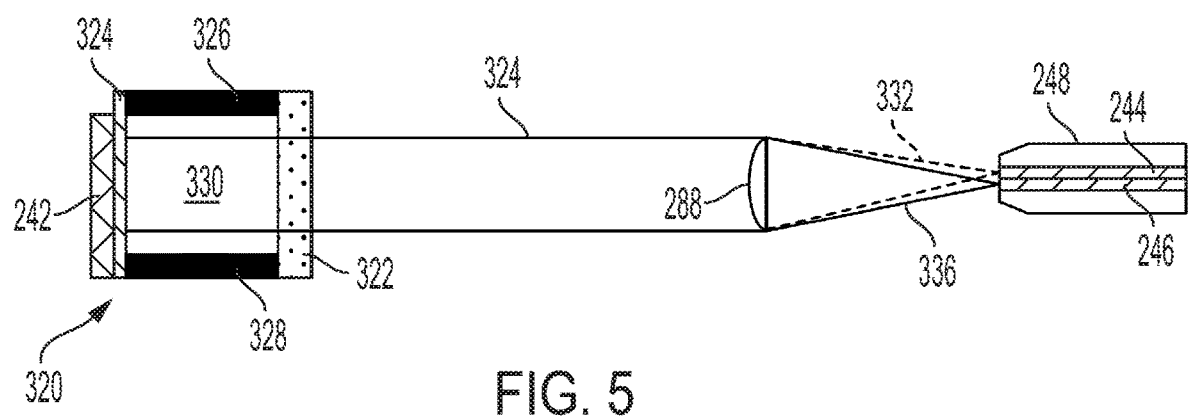
FIG. 5 is a schematic view of a sample cartridge configured for reflectance spectroscopy being used in the apparatus shown in FIG. 2, in accordance with an example embodiment.

FIG. 5 shows a cross-section view of an example sample cartridge 320 configured for the reflectance spectroscopy mode. In this example, sample cartridge 320 has a transparent front surface 322, a reflective back surface 324, an opaque top surface 326, and an opaque bottom surface 328, all of which define an internal sample chamber 330 that contains a sample. The reflective back surface 324 covers the reflective surface 242 in the cartridge slot 240.

For the reflectance spectroscopy mode, lens 288 (but not lens 290) is positioned in the first illumination optical path and the collection optical path between the sample cartridge 320 and the bifurcated fiber assembly 248, as shown in FIG. 5. Light 332 is emitted from the proximal end of first optical fiber 244 (light 332 is indicated by the dotted lines in FIG. 5) toward the lens 288. Lens 288 collimates the emitted light 332 to provide incident collimated light 334 directed toward the sample cartridge 320. The incident collimated light 334 enters the sample chamber 330 through the transparent front surface 322, passes through the sample chamber 330, and is reflected by the reflective back surface 324 as reflected collimated light 334. The reflected collimated light 334 passes through the sample chamber 330, emerges from the sample cartridge 320 through the transparent front surface 322, and reaches the lens 288. Lens 288 focuses the reflected collimated light 334 onto the proximal end of the second optical fiber 246 as collected light 336. In FIG. 5, the reference number 334 indicates both the incident collimated light and the reflected collimated light as the incident collimated beam and the reflected beam collimated beam are nearly coincident.

Figure 6:
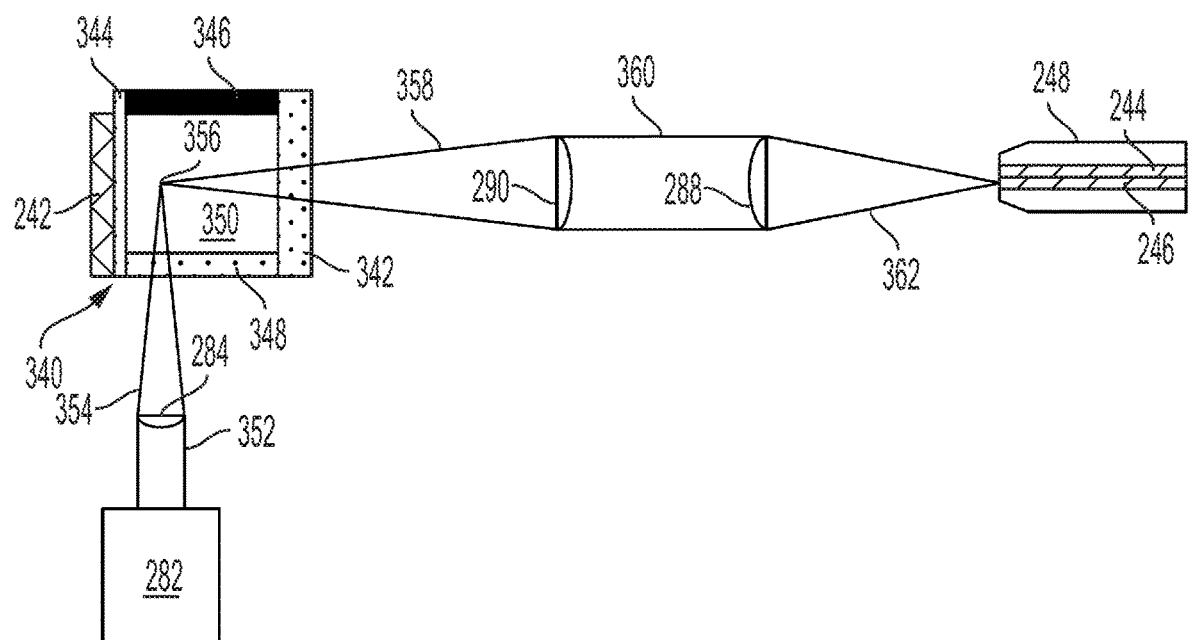
FIG. 6 is a schematic view of a sample cartridge configured for intensity spectroscopy being used in the apparatus shown in FIG. 2, in accordance with an example embodiment.

FIG. 6 shows a cross-section view of an example sample cartridge 340 configured for the intensity spectroscopy mode. In this example, sample cartridge 340 has a transparent front surface 342, a transparent back surface 344, an opaque top surface 346, and a transparent bottom surface 348, all of which define an internal sample chamber 350 that contains a sample. The transparent back surface 344 covers the reflective surface 242 in the cartridge slot 240.

For the intensity spectroscopy mode, both lens 288 and lens 290 are positioned in the collection optical path between the sample cartridge 340 and the bifurcated fiber assembly 248, as shown in FIG. 6 (the first illumination optical path is not used in the intensity spectroscopy mode). Collimated light 352 is emitted from the internal light source 282 and is focused by lens 284 to provide focused light 354 that enters the sample chamber 350 through the transparent bottom surface 348. The focused light 354 is focused to a focal point 356 within the sample chamber 350. In this example, the focused light 354 in the sample chamber 350 excites fluorophores present in the sample, thereby causing the fluorophores to emit fluorescence light. A portion 358 of the emitted fluorescence light is collected by lens 290. Lens 290 collimates the collected light to provide collimated light 360 directed toward lens 288. Lens 288 focuses the collimated light 360 onto the proximal end of the second optical fiber 246 as collected light 362.

In the example shown in FIG. 6, lens 284 and lens 290 are co-focused at focal point 356 within sample chamber 350. In practice, lens 290 may collect fluorescence light from a focal region around focal point 356. Further, some of the fluorescence light that is collected by lens 290 may be generated near focal point 356, pass through the transparent back surface 344, reflect from reflective surface 242, and pass through the transparent back surface 344 again before being collected by lens 290.

Figure 7:
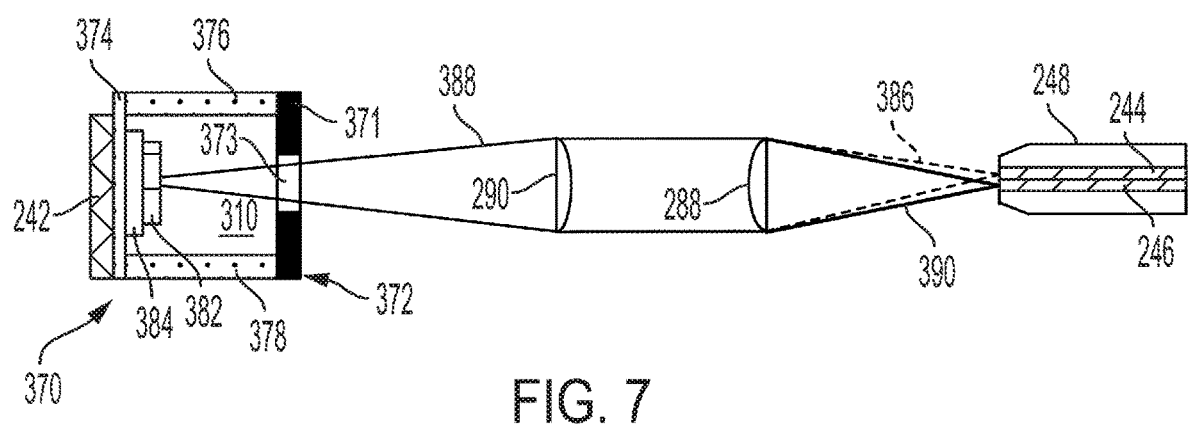
FIG. 7 is a schematic view of a sample cartridge configured for scattered light spectroscopy being used in the apparatus shown in FIG. 2, in accordance with an example embodiment.

FIG. 7 shows a cross-sectional view of an example sample cartridge 370 configured for the scattered light spectroscopy mode. In this example, sample cartridge 370 has a front surface 372 that includes an opaque portion 371 and a transparent portion (window) 373, a transparent back surface 374, a transparent top surface 376, and a transparent bottom surface 378, all of which define an internal sample chamber 380 that contains a sample. In this example, the sample is provided in a test strip that includes a sample pad 382 disposed on a strip backing 384. The window 373 is aligned with the sample pad 382. The window 373 could be either a transparent portion of the front surface 372 or an opening formed in the front surface 372. In use, the sample (e.g., a urine sample) is applied to the sample pad 382 where it interacts with reagents to produce a color change. The test strip is then inserted into the sample cartridge with the sample pad 382 facing the transparent front surface 372 and the sample backing 384 positioned against the transparent back surface 374 (so as to cover the reflective surface 242 in the cartridge slot 240).

For the scattered light spectroscopy mode, both lens 288 and lens 290 are positioned in the first illumination optical path and the collection optical path between the sample cartridge 370 and the bifurcated fiber assembly 248, as shown in FIG. 7. Light 386 is emitted from the proximal end of the first optical fiber 244 (light 386 is indicated by the dotted lines in FIG. 7) toward the lens 288. Lens 288 collimates the emitted light 386 and directs the collimated light to lens 290. Lens 290 focuses the light from lens 288 onto the sample pad 382 through the window 373 and collects scattered light 388 from the sample pad 388 through the window 373. Lens 290 also collimates the scattered light 388 and directs the collimated scattered light to lens 288. Lens 288 focuses the collimated scattered light onto the proximal end of the second optical fiber 246 as collected light 390.

Figure 8A:
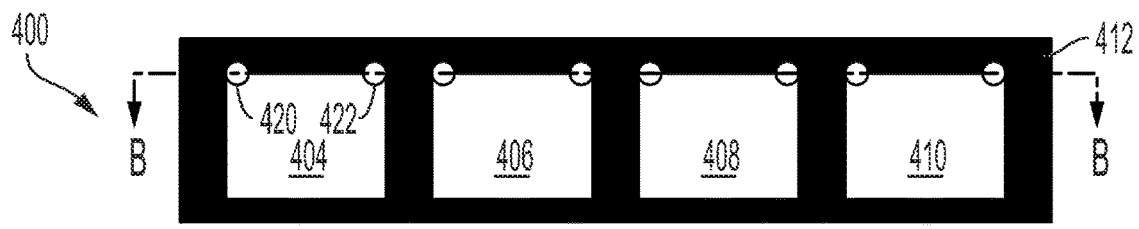
FIG. 8A is a front view of a sample cartridge configured for transmission spectroscopy, in accordance with an example embodiment.
Figure 8B:
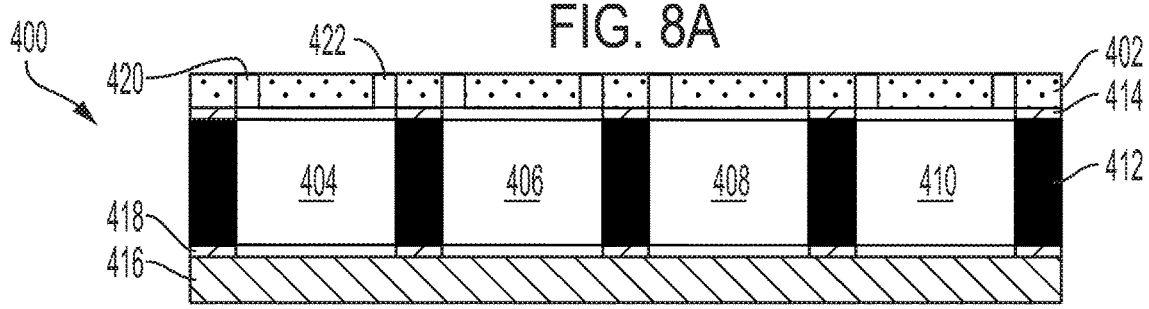
FIG. 8B is a cross-sectional view of the sample cartridge shown in FIG. 8A, in accordance with an example embodiment.
Figure 8C:
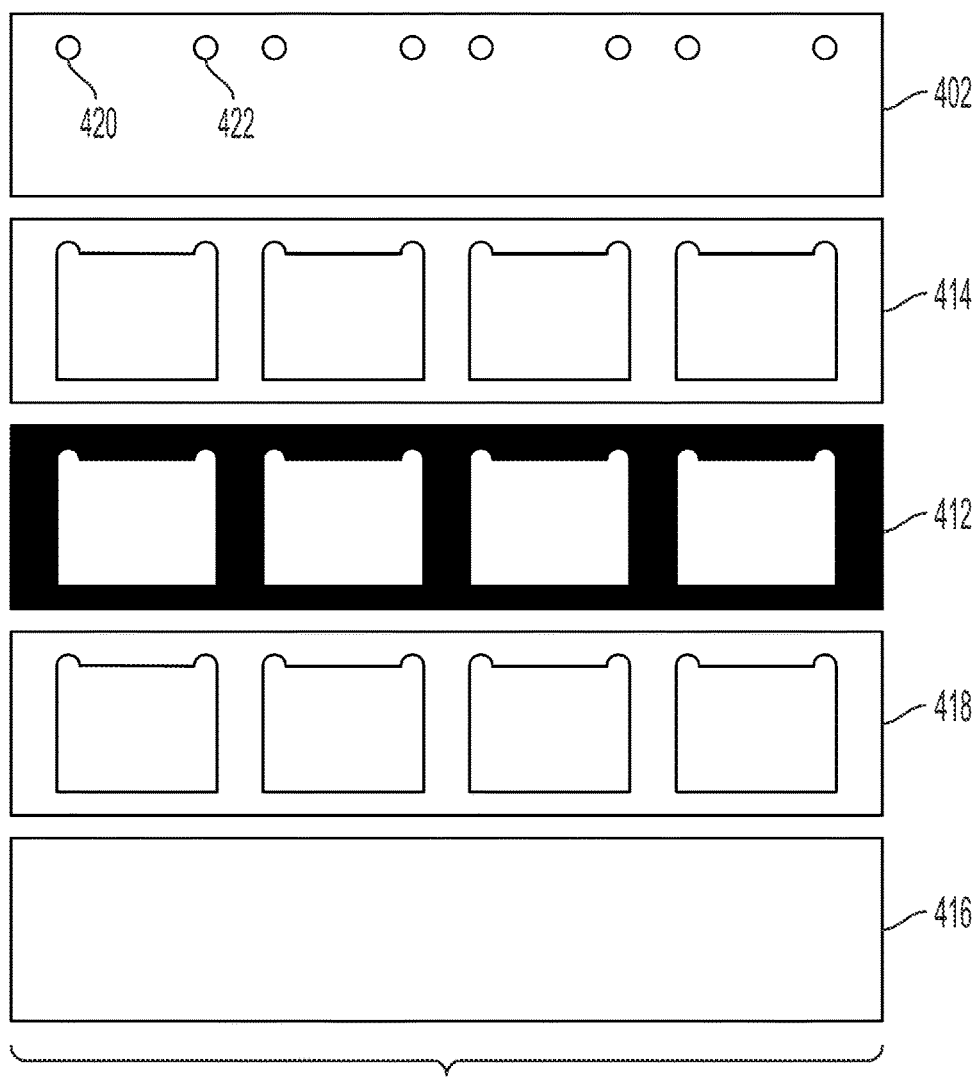
FIG. 8C illustrates the individual layers of the sample cartridge shown in FIG. 8A, in accordance with an example embodiment.

FIGS. 8A-8C illustrate the construction of an example sample cartridge 400 configured for the transmission spectroscopy mode. FIG. 8A is a front view of the sample cartridge 400 through the transparent front surface 402, FIG. 8B is a cross-sectional view of the sample cartridge 400 along line B-B shown in FIG. 8A, and FIG. 8C illustrates the individual layers in the sample cartridge 400.

FIG. 8A shows sample chambers 404-410 that are formed in the cartridge body 412 and visible behind the transparent front surface 402. As shown in FIG. 8B, the transparent front surface 402 is attached to the cartridge body 412 via a front adhesive layer 414. FIG. 8B also shows a transparent back surface 416 attached to the cartridge body via a back adhesive layer 418. Each of the sample chambers 404-410 can be accessed from outside of the sample cartridge 400 via a pair of access ports, exemplified in FIGS. 8A and 8B by access ports 420 and 422 connected to sample chamber 404. The access ports 420 and 422 may be used to introduce a sample into sample chamber 404, for example, with the sample flowing through one of the access ports while the other access ports acts as a vent. In one example, the spacing between the access ports of adjacent sample chambers is chosen to correspond to the spacing between adjacent channels in an 8-channel multi-pipette.

The transparent front surface 402, front adhesive layer 414, cartridge body 412, back adhesive layer 418, and transparent back surface 416 are shown individually in FIG. 8C. The openings shown in the front adhesive layer 414, the cartridge body 412, and the back adhesive layer 418 align together to form the sample chambers 404-410 in the assembled sample cartridge 400. The access ports (e.g., access ports 420 and 422) are created by forming openings in the transparent front surface 402 which align with the sample chambers in the assembled sample cartridge 400.

In an example embodiment, the transparent front surface 402 is provided as a thin acrylic sheet (e.g., about 1/16 thick), the cartridge body 412 is provided as a thicker acrylic sheet (e.g., about 3/8 inch thick), the front adhesive layer 414 and back adhesive layer 418 are provided as a 50-μm thick double-sided adhesive (DSA) (3M, Optically Clear Adhesive 8212), and the transparent back surface 416 is provided as a cut glass slide (e.g., about 1 mm thick). With these materials, the openings in the transparent front surface 402, the front adhesive layer 414, the cartridge body 412, and the back adhesive layer 418 shown in FIG. 8C can be formed by laser cutting.

The cartridge body 412 can be dyed with opaque black dye (Dykem 81724) to prevent optical communication between adjacent sample chambers and to provide a clear boundary between sample chambers for automated sensing of the sample chambers as the sample cartridge is inserted into the cartridge slot during video-based cartridge scanning.

Figure 9A:
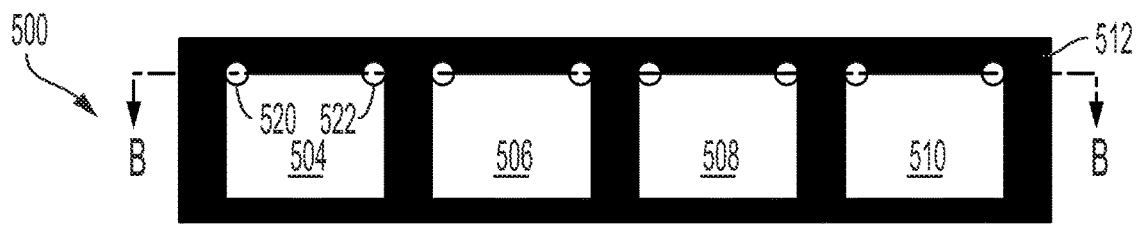
FIG. 9A is a front view of a sample cartridge configured for reflectance spectroscopy, in accordance with an example embodiment.
Figure 9B:
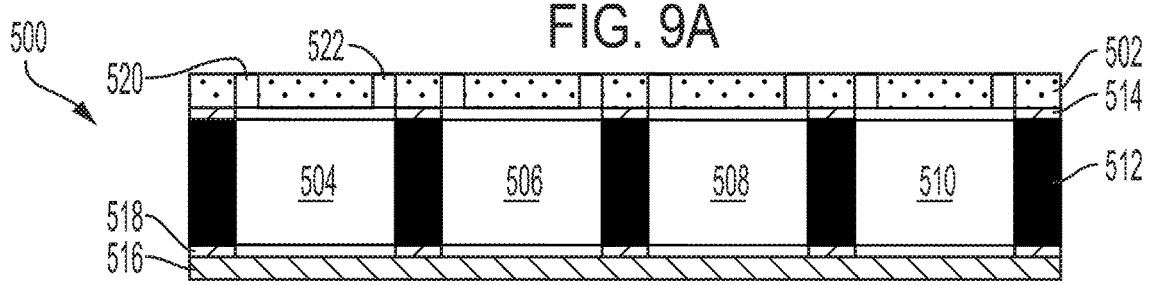
FIG. 9B is a cross-sectional view of the sample cartridge shown in FIG. 9A, in accordance with an example embodiment.
Figure 9C:
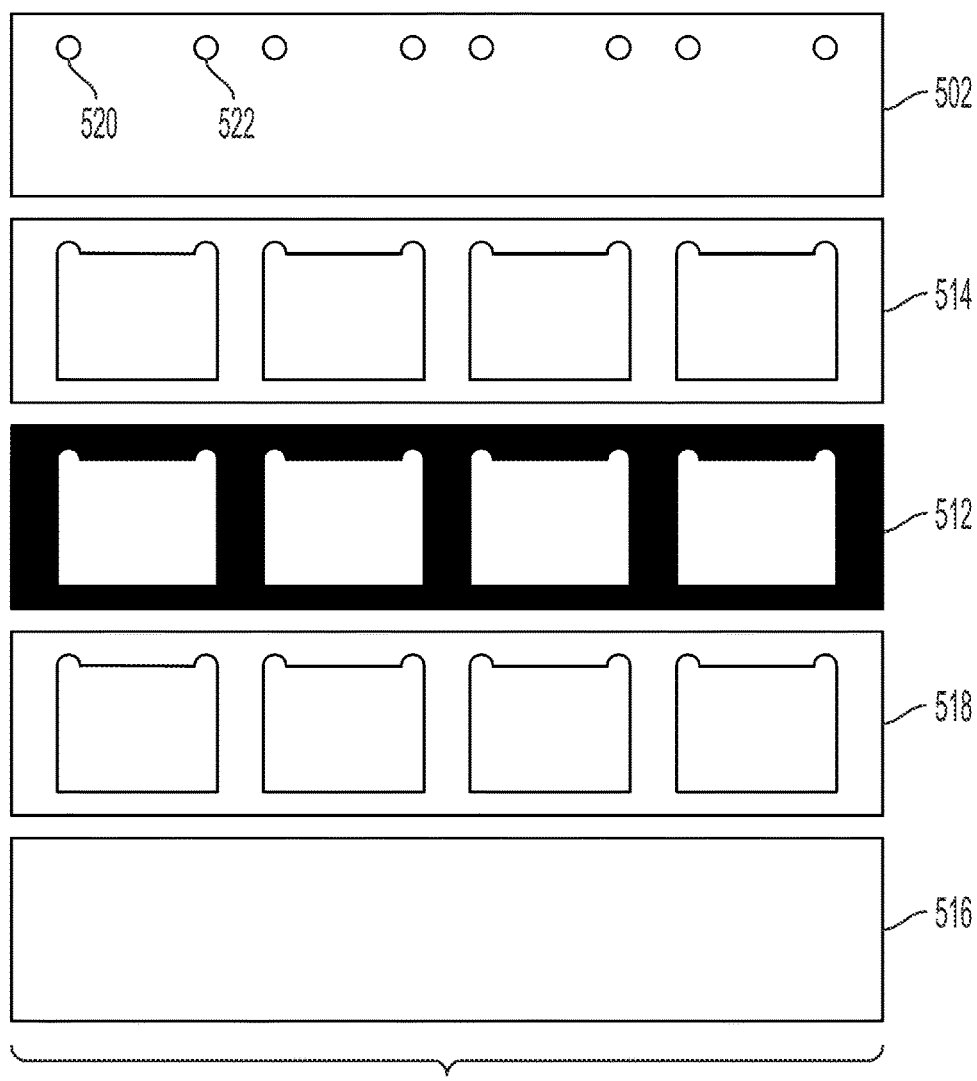
FIG. 9C illustrates the individual layers of the sample cartridge shown in FIG. 9A, in accordance with an example embodiment.

FIGS. 9A-9C illustrate the construction of an example sample cartridge 500 configured for the reflection spectroscopy mode. The sample cartridge 500 illustrated in FIGS. 9A-9C is similar to the sample cartridge 400 illustrated in FIG. 8A-8C but with a reflective back surface instead of a transparent back surface. Thus, FIGS. 9A-9C show a transparent front surface 502, sample chambers 504-510, a cartridge body 512, a front adhesive layer 514, a back adhesive layer 516, a reflective back surface 518, and access ports 522 and 524. In an example embodiment, the reflective back surface is a PC-coated polycarbonate film (e.g., about 200 μm thick).

Figure 10A:
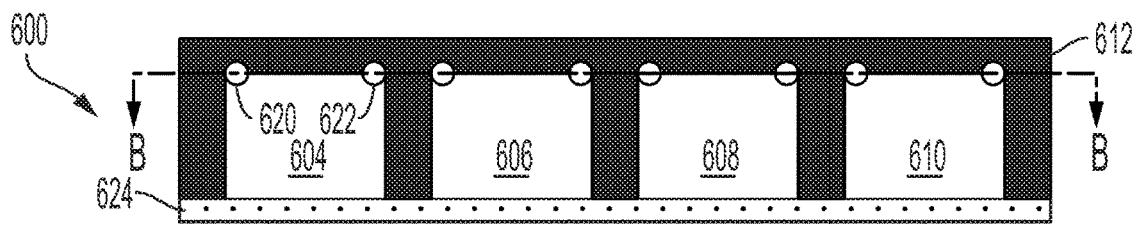
FIG. 10A is a front view of a sample cartridge configured for intensity spectroscopy, in accordance with an example embodiment.
Figure 10B:
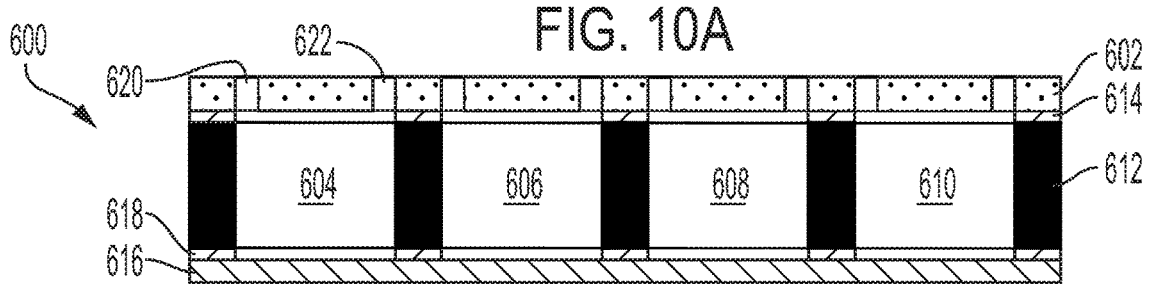
FIG. 10B is a cross-sectional view of the sample cartridge shown in FIG. 10A, in accordance with an example embodiment.
Figure 10C:
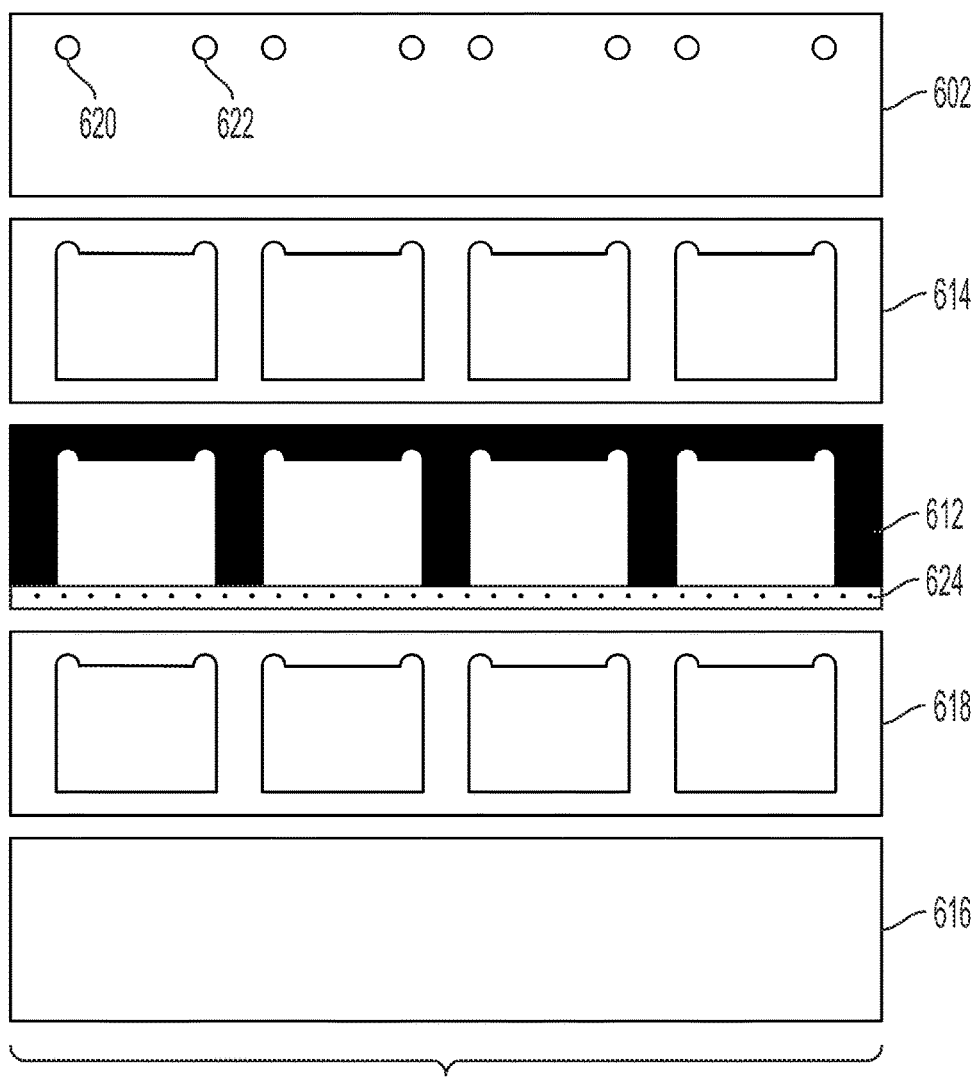
FIG. 10C illustrates the individual layers of the sample cartridge shown in FIG. 10A, in accordance with an example embodiment.

FIGS. 10A-10C illustrate the construction of an example sample cartridge 600 configured for the intensity spectroscopy mode. The sample cartridge 600 illustrated in FIGS. 10A-10C is similar to the sample cartridge 400 illustrated in FIG. 8A-8C. Thus, FIGS. 10A-10C show a transparent front surface 602, sample chambers 604-610, a cartridge body 612, a front adhesive layer 614, a back adhesive layer 616, a reflective back surface 618, and access ports 622 and 624. However, cartridge body 612 differs from cartridge body 412 in that not all of cartridge body 612 is dyed opaque. Instead, the bottom portion of cartridge body 612 is left undyed to provide a transparent bottom surface 624. Also, in an example embodiment, transparent back surface 616 is provided as an acrylic film (e.g., about 200 μm thick), in contrast to transparent back surface 416 described above.

FIG. 11 is a cross-sectional view of an example sample cartridge 700 configured for scattered light spectroscopy of a single-reagent test strip 702 disposed within the sample cartridge 700. The single-reagent test strip 702 includes a strip backing 704 and a sample pad 706. The sample cartridge 700 includes a front layer 710 that defines a front surface of the sample cartridge 700, a cavity layer 712 that includes a cavity or other space in which the test strip 702 is disposed, and a back layer 714 that defines a back surface of the sample cartridge 700. In one example, front layer 710 is an acrylic layer with a thickness of about 0.03 inches, cavity layer 712 is an acrylic layer with a thickness of about 0.375 inches, and back layer 714 is a polycarbonate film. The front layer 710 can be dyed so as to be opaque, except for a window 716 located over the sample pad 706. In the example shown in FIG. 11, the front layer 710 has a dyed portion 718 to the left or the window 716 and a dyed portion 720 to the right of the window 716. The window 716 could be, for example, a laser-cut opening in the front layer 710 or a transparent, undyed portion of the front layer. The cavity layer 712 may have a laser-cut cavity into which the test strip 712 can be inserted. The front layer 710 and the back layer 714 may be attached to the cavity layer 712 by respective layers of double-sided adhesive. In some implementations, the layers 710, 712, and 714 may be attached together after the test strip 702 has been inserted into the cavity layer 712. In other implementations, the cavity layer 712 may have an opening on the side so that the test strip 702 can be inserted into the sample cartridge 700 after the layers 710, 712, and 714 have been attached together. In either case, the test strip 702 may be held in a specific position within the sample cartridge 700, for example, by means of an adhesive that bonds a portion of the strip backing 704 to the back layer 714.

Once the test strip 702 has been positioned within the sample cartridge 700, the sample cartridge 700 can be inserted into the cartridge slot of the apparatus. The window 716 allows light from the first illumination optical path to illuminate the sample pad 706 and allows scattered light from the sample pad 706 to be collected through the collection optical path (e.g., as shown in FIG. 7). The smartphone camera can be operated in a video mode as the sample cartridge 700 is being inserted into the cartridge slot. With front layer 710 dyed as shown in FIG. 11, the resulting video frames will be dark as the dyed portion 718 passes through the first illumination and collection optical paths. However, as the window 716 passes through the first illumination and collection optical paths, the resulting video frames will include spectra corresponding to scattered light from the sample pad 706. Then, as the dyed portion 720 passes through the first illumination and collection optical paths, the resulting video frames will again be dark. Multiple video frames corresponding to collection of scattered light through window 716 can be averaged together.

FIG. 12 is a cross-sectional view of an example sample cartridge 800 configured for scattered light spectroscopy of a multi-reagent test strip 802 disposed within the sample cartridge 800. In this example, the multi-reagent test strip 802 includes ten sample pads 804-813 disposed on a strip backing 814. The configuration of sample cartridge 800 can be similar to that of sample cartridge 700 but with multiple windows to allow the multiple sample pads 804-813 to be individually distinguished. In this example, sample cartridge 800 includes a front layer 820, a cavity layer 822, and a back layer 824. The front layer 820 can be dyed opaque except for windows 834-843 corresponding to sample pads 804-813. The windows 834-843 could be formed by, for example, laser-cutting openings into the front layer 820 or by leaving portions of the front layer 820 undyed. The dyed portions of front layer 820, such as dyed portions 844, 856, and 846, can be used to delimit video frames that correspond to different sample pads. For example, the sample cartridge 800 may be inserted into the cartridge slot with the smartphone camera configured to capture video. The resulting video would then include one or more dark frames corresponding to dyed portion 844, then one or more frames with spectra corresponding to scattered light from sample pad 804, then one or more dark frames corresponding to dyed portion 845, then one or more frames with spectra corresponding to scattered light from sample pad 805, then one or more dark frames corresponding to dyed portion 846, and so forth. In this way, the frames corresponding to sample pad 804 can be identified and then averaged together into a single, composite image.

The frames corresponding to sample pad 805 and the other sample pads in test strip 802 can similarly be identified and averaged together to form a separate composite image for each sample pad.

It is to be understood that the above descriptions of sample cartridges are given by way of example only. Other materials, dimensions, configurations, and fabrication methods could be used.

4. Example Mobile Computing Device

Figure 13:
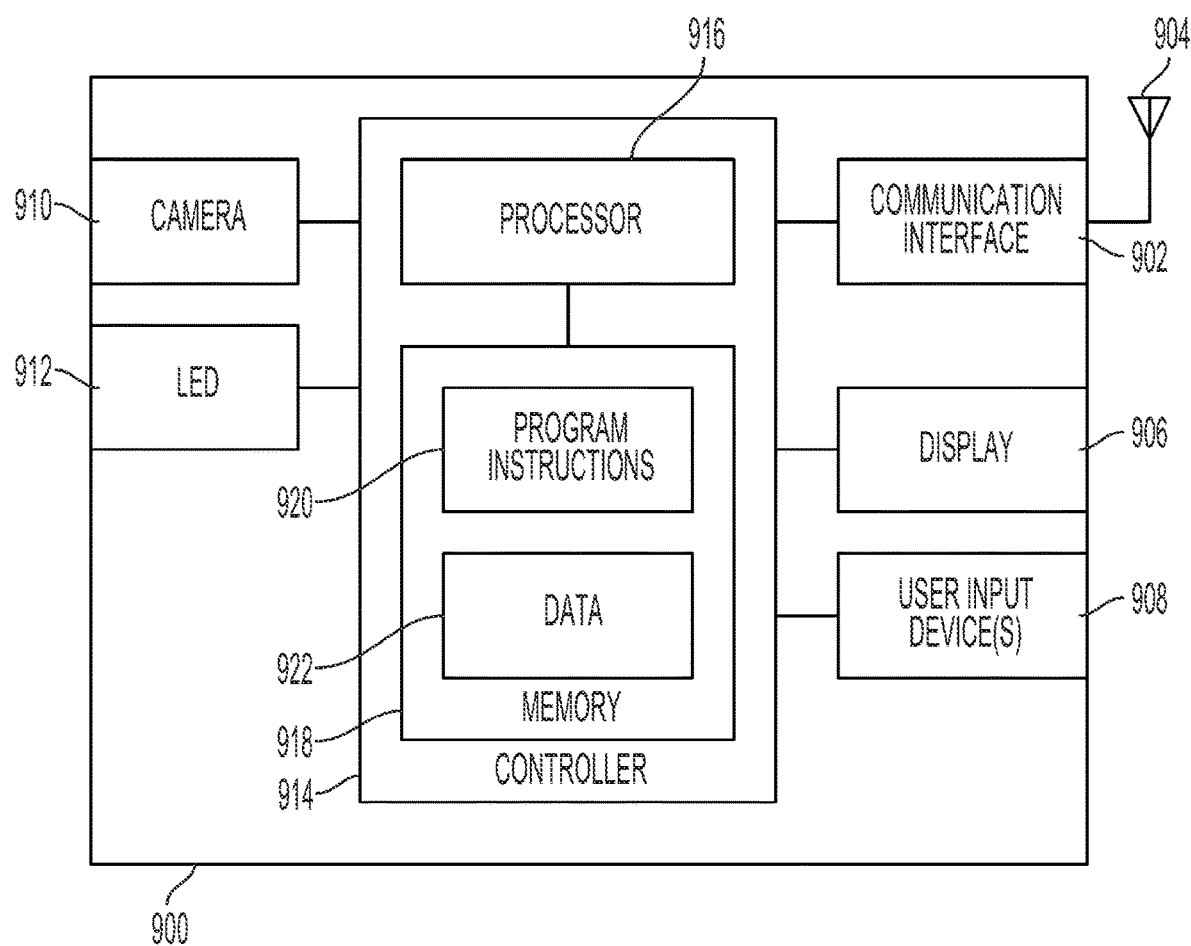
FIG. 13 is a block diagram of an example mobile computing device, in accordance with an example embodiment.

FIG. 13 is a block diagram illustrating an example mobile computing device 900. The mobile computing device 900 could be a smartphone, a handheld computer, a tablet computer, or other portable computing device. For example, mobile computing device 900 could correspond to smartphone 102 shown in FIGS. 1A and 1B or smartphone 202 shown in FIG. 2.

The mobile computing device 900 includes a communication interface 902 for wireless communication via an antenna 904. The wireless communication could involve sending or receiving voice, images, video, data, or other information. The wireless communication could use any type of wireless communication protocol, such as 3G or 4G cellular communication protocols, WiFi, or Bluetooth. Instead of or in addition to communication interface 902, the mobile computing device 900 may include a communication interface for communicating over USB, Ethernet, or other wired connections.

The mobile computing device 900 also includes a display 906 and one or more user input device(s) 908. The display 906 can display text, images, graphics, or other visual information. The user may enter input (e.g., information, commands, etc.) or otherwise interact with the mobile computing device 900 via the user input device(s) 908. In one example, the user input device(s) 908 may include a touchscreen over the display 906. Alternatively or additionally, the user input device(s) 908 may include a keypad, buttons, or other controls.

The mobile computing device 900 is able to capture still images and/or images through the use of a camera 910. The camera 910 includes a lens and an image sensor, such as a CCD. The camera 910 could be on a side of the mobile computing device 900 that is opposite the side that includes the display 906. The mobile computing device 900 may also include a light source, such as a white-light LED 912, next to the camera 910. The LED 912 may be intended or flash photography, for example.

The mobile computing device 900 may be controlled by a controller 914 that includes a processor 916 and a memory 918. The memory 918 could include random access memory (RAM), read-only memory (ROM), flash memory, or any other type of non-transitory media. The memory 918 may store program instructions 920 and data 922. The processor 916 may execute the program instructions 920 to cause the mobile computing device 900 to perform operations, which could include any of the operations described herein. The operations may involve communicating via the communication interface 902, displaying output on display 906, receiving user input via user input device(s) 908, using camera 910 to obtain images (still images or video), and/or controlling the illumination of LED 912. In some examples, the program instructions 920 may include software for one or more applications (often known as "Apps") that can be accessed by a user.

With reference to the measurements discussed below, a custom Android App was developed to assist with data collection. The App allows the user to set parameters, including exposure time and focal length, to constant values to provide for inter-assay consistency and to facilitate data collection. After the assay of choice has been completed and is ready to be measured, the App allows the user to choose the number of samples, standards, and replicates before walking the user through collection steps for each liquid chamber and/or cartridge.

In general, an App or other programming on a smartphone (or other mobile computing device) could receive, via the user interface, an input indicative of a selected spectroscopy mode from the various spectroscopy modes supported by the apparatus to which the smartphone is coupled. Thus, the user could select the transmission spectroscopy mode, the reflectance spectroscopy mode, the intensity spectroscopy mode, or the scattered light spectroscopy mode. Once the user has selected the mode of operation, the App may prompt the user for additional information, such as information regarding the assay to be run, the type of samples being assayed, and/or other parameters (alternatively, the App may select the spectroscopy mode based on the assay selected by the user). The user can then slide the sample cartridge into the cartridge slot while the App controls the image sensor to obtain one or more spectrum images, either as still images or frames of video. The one or more spectrum images may correspond to different samples in the sample cartridge. Each spectrum image includes one or more spatially-separated wavelength components, which may be indicative of transmission of light through the sample, reflection of light from the sample interacting with a PC, emission of light from the sample, or scattered light from the sample, depending on the selected mode.

For the transmission, reflectance, and scattered light modes, the App can also control the light source on the smartphone as the spectrum images are obtained. For the intensity mode, the App may prompt the user to turn on the internal light source (e.g., laser diode) in the apparatus. Once the one or more spectrum images are obtained, the App can process them in accordance with the selected mode. For the transmission mode, the App may identify one or more wavelengths in the spectrum images indicative of absorption by the sample. For the reflectance mode, the App may identify a wavelength indicative of reflectance affected by the sample (e.g., a shift in the resonant reflection wavelength from a PC). For the intensity mode, the App may identify a wavelength indicative of fluorescence from fluorophores in the sample. For the scattered light mode, the App may identify a range of wavelengths in the spectrum images that can be used to characterize the color of a sample pad of a test strip. In each of these modes, the App may then analyze the relevant wavelengths to determine a result of the assay (e.g., to determine the concentration of an analyte in a sample) and may display the results to the user.

The App may also support video-based data collection. In this approach, the camera 910 is operated in a video mode as the sample cartridge is moved through the cartridge slot in a swiping motion. For example, the camera could capture a video at a rate of 60 frames per second so as to obtain a time-sequence of images. In this time-sequence, different images correspond to different portions of the sample cartridge as the sample cartridge moves through the cartridge slot. Advantageously, a sample cartridge can be constructed such that samples are disposed at one or more sample locations (e.g., sample chambers or sample pads of a test strip) that are arranged in a linear sequence, with delimiting structures that delimit or define the boundaries of individual sample locations in the sequence. Such sample cartridges are illustrates in FIGS. 8A-8C, 9A-9C and 10A-10C, 11, and 12. Further, the delimiting structures in the sample cartridge can be formed such the delimiting structures can be readily distinguished from the sample locations in the images. In one approach, the delimiting structures absorb light (e.g., dyed black) so that images of delimiting structures will be relatively dark and images of sample locations will be relatively bright. This approach is illustrated in FIGS. 8A-8C, 9A-9C and 10A-10C, in which dyed portions of the cartridge body are located between adjacent sample chambers, and in FIG. 12, in which dyed portions of the front surface are located between adjacent sample pads of a test strip.

With this approach, the time-sequence of images in the captured video can be processed to identify one or more images for each sample location. In particular, one or more bright images corresponding to a particular sample location will occur in the time-sequence (i) after at least one preceding dark image corresponding to a delimiting structure on one side of the particular sample location and (ii) before at least one subsequent dark image corresponding to a delimiting structure on the other side of the particular sample location. The locations of the preceding and subsequent dark images in the time-sequence can be used to select a bright image that occurs between them in the time-sequence as corresponding to the center or approximate center of the particular sample location. The selected bright image can then be used to determine a spectral characteristic of a particular sample at the particular sample location. In some implementations, the selected bright image may be averaged with one or more adjacent images in the time-sequence to obtain a composite image, and the composite image may then be used to determine the spectral characteristic. As discussed above, the spectral characteristic could be a characteristic of transmitted light, reflected light, emitted light (e.g., fluorescence), or scattered light, depending on the selected spectroscopy mode.

5. Example Measurements a. Proof-of-Concept Measurements

Using the apparatus described above, with a smartphone programmed with the custom App described above, qualitative proof-of-concept measurements for each of the four modalities were completed using test samples in the respective sample cartridge chambers.

Figure 14:
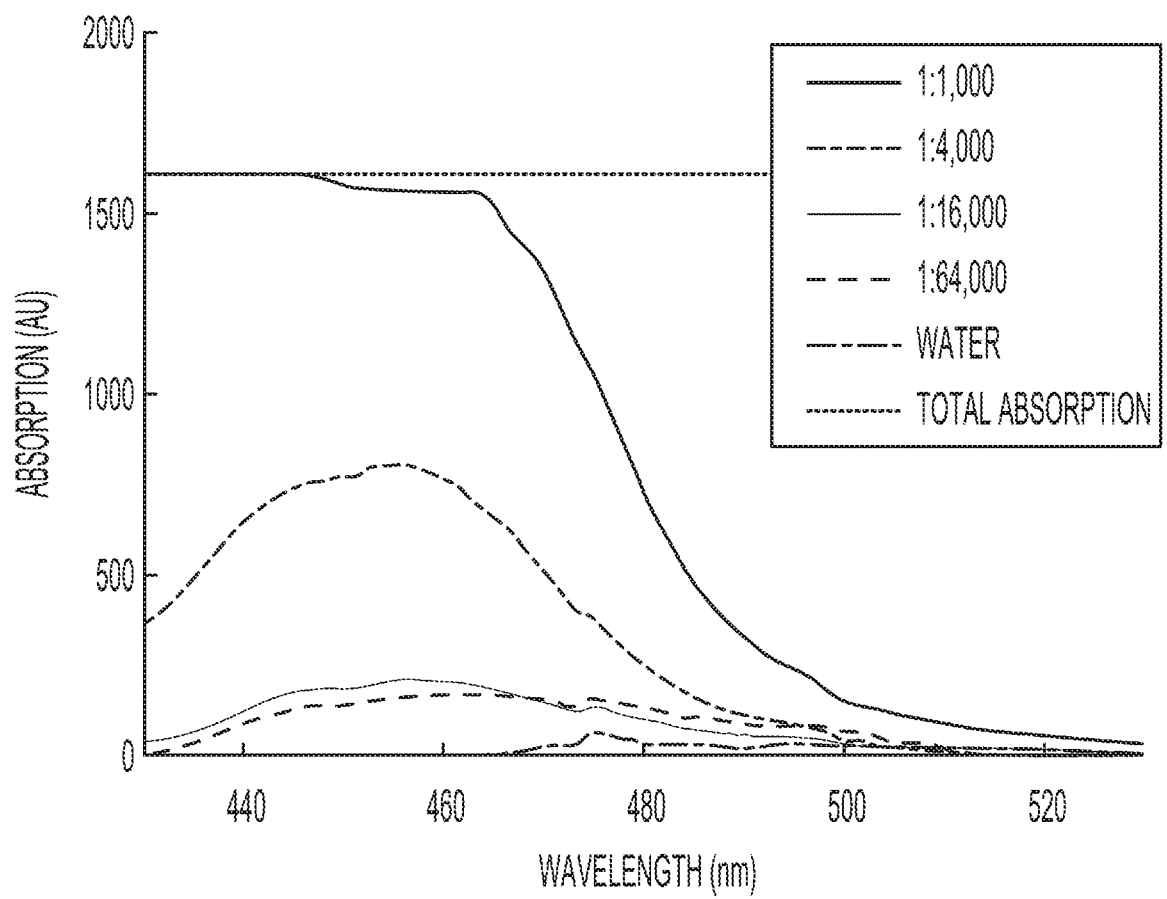
FIG. 14 illustrates absorption as a function of wavelength for various concentrations of yellow dye diluted in water, as measured by the system shown in FIG. 1A.

To demonstrate the transmission spectroscopy mode, yellow food dye (McCormick) was diluted in water at concentrations ranging from 1:1,000 to 1:64,000, a 64× concentration range. Absorption was measured by subtracting sample transmission from that of water. Observable absorption occurred in the blue region (400-500 nm) of the spectrum, as illustrated in FIG. 14. Thus, concentration-dependent absorbance was observed.

Figure 15:
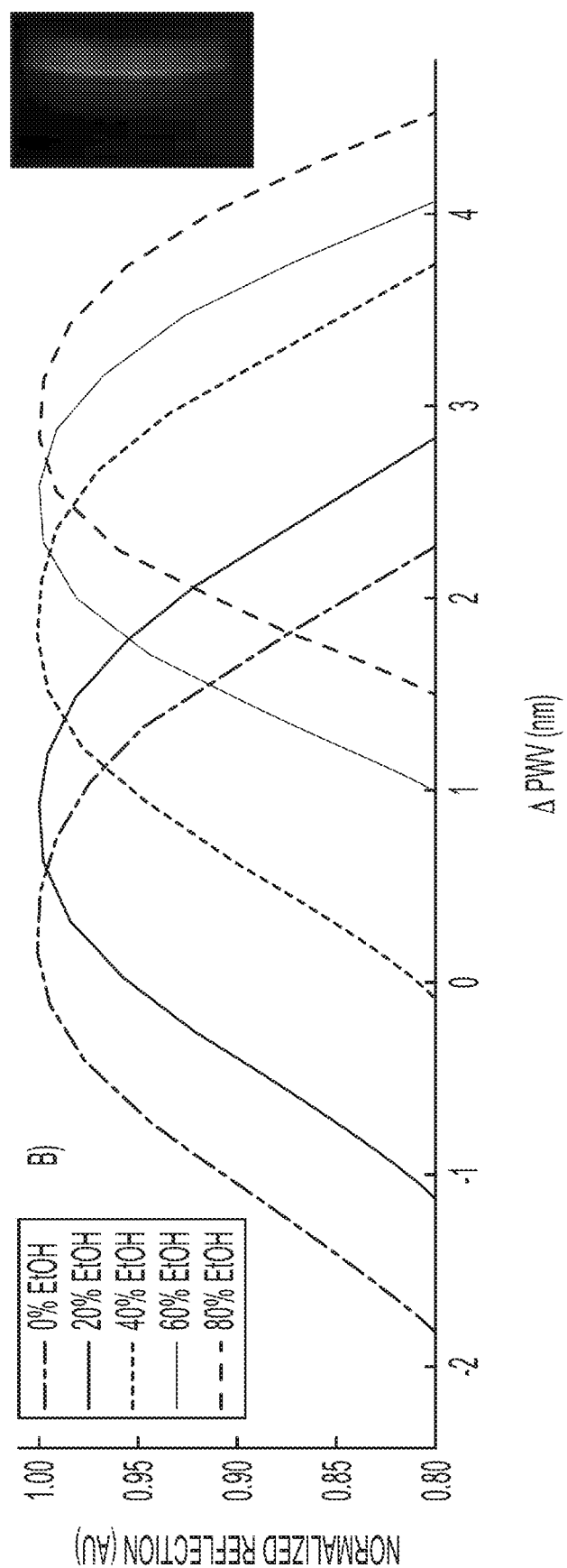
FIG. 15 illustrates peak wavelength shifts for different concentrations of ethanol in water, as measured by the system shown in FIG. 1A.

To demonstrate the reflection spectroscopy mode, a sample cartridge with a PC-based reflective back surface was used. Mixtures of 0%, 20%, 40%, 60%, and 80% ethanol (EtOH) in water were prepared and introduced into the sample cartridge in order to observe the effect of changing the bulk refractive index of the liquid in contact with the PC. Only a narrow band of wavelengths were efficiently reflected by the PC, representing a narrow bright red band in the spectrum image obtained by the smartphone's image sensor (FIG. 15 includes an example of such a spectrum image). A single cartridge was filled with water, followed by the five EtOH concentrations to normalize for intra-sensor variation in starting resonance wavelength. By taking the middle row of pixels from the raw images, a clear relationship was observed between the change in peak wavelength value (PWV) reflected from the PC with the addition of EtOH solutions and the refractive index of the liquid inside the fluid compartment, corresponding to a 114.0 nm/RIU bulk refractive index sensitivity. The peak wavelength shifts ($\Delta$PWV) observed for the different EtOH concentrations are illustrated in FIG. 15.

Figure 16:
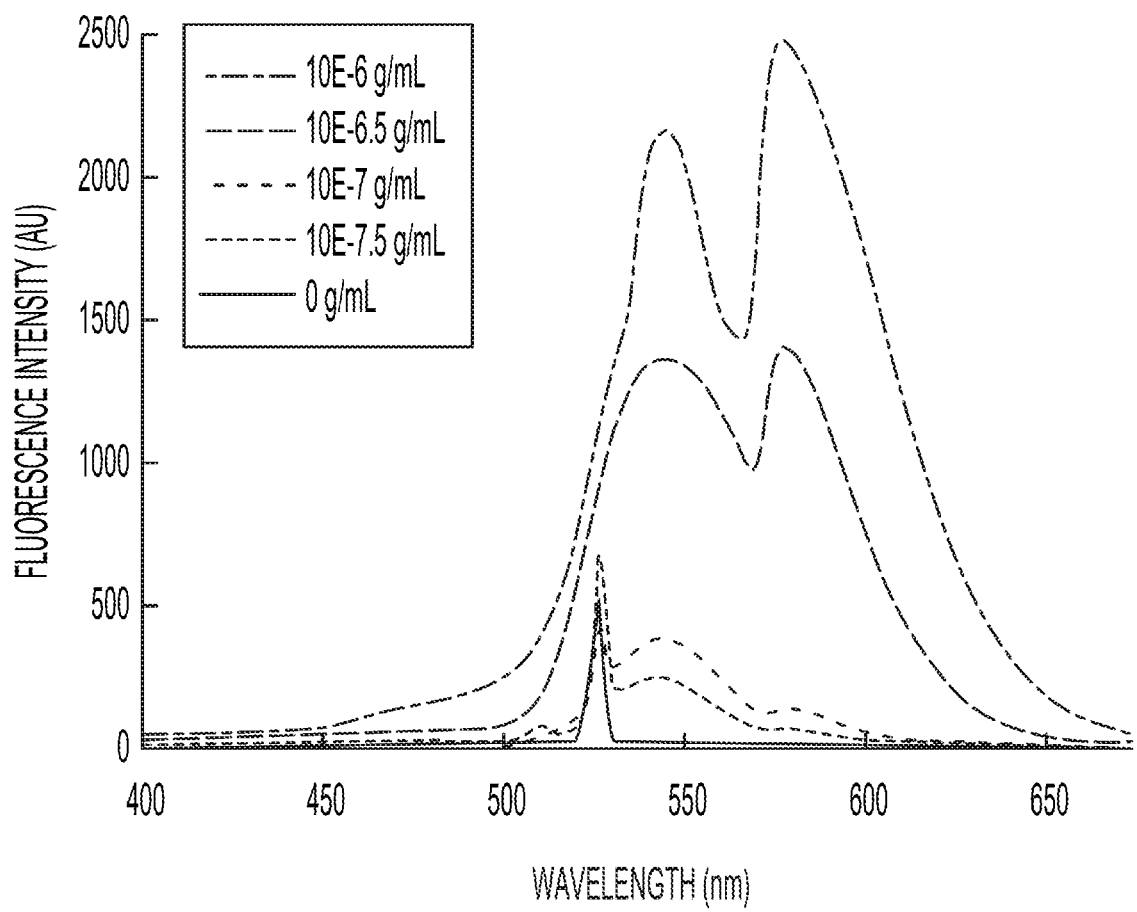
FIG. 16 illustrates fluorescence spectra for different concentrations of rhodamine 590 chloride, as measured by the system shown in FIG. 1A.

To demonstrate the intensity spectroscopy mode, the internal light source (laser diode) was used to excite the fluorescent emission of rhodamine 590 chloride (R6G) (Exciton) within a sample cartridge configured for intensity measurements. The dye was diluted to concentrations between $10^{-6}$ and $10^{-7.5}$ g/mL, and resultant images were processed to generate fluorescence intensity spectra, shown in FIG. 16. The green emission from R6G was clearly visible over the entire range of concentrations. The intensity of this green emission was concentration dependent. Further, due to the orthogonal illumination, a minimal amount of light from the laser diode illumination source was present within the fluorescence emission spectra, even at low R6G concentrations.

To demonstrate the light-scattering spectroscopy mode, tests were performed using single-reagent test strips and multi-reagent test strips. The single-reagent test strips used for validation were commercially available test strips (Bayer Ketostix test strips) designed to detect acetoacetic acid (a ketone) in urine. These test strips are provided with reference colors corresponding to concentrations of 0, 5, 15, 40, and 80 md/dL. The smartphone used in this study (Samsung Galaxy S3) included various pre-set white balance options to adjust the camera for the ambient light "temperature." The "cloudy" setting was selected because it generated the highest overall intensity and was the best setting to differentiate the five reference colors. Further, the wavelength range of 589-612 nm was identified as having the greatest degree of separation between the reference colors. The area under the curve (AUC) for this wavelength range was used for the single-reagent test strip measurements.

Figure 17A:
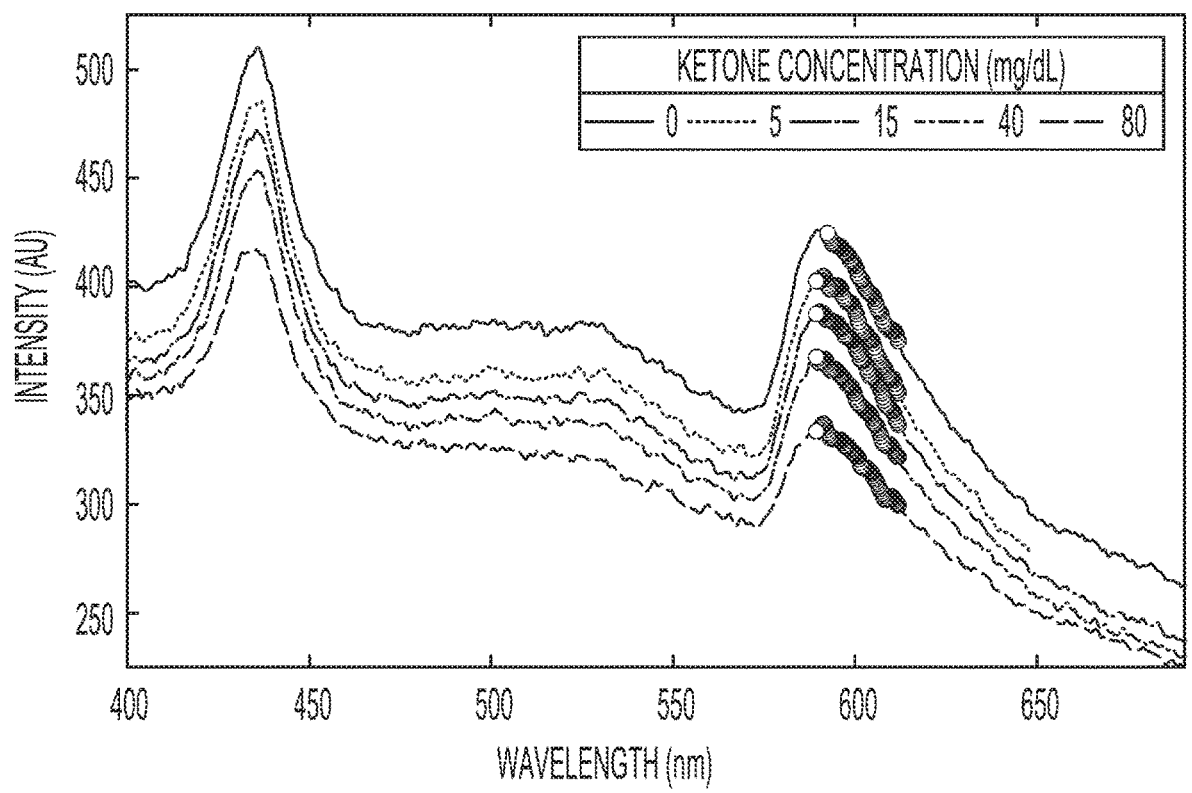
FIG. 17A illustrates scattered light spectra for detection of acetoacetic acid (ketone) using single-reagent test strips, as measured by the system shown in FIG. 1A.
Figure 17B:
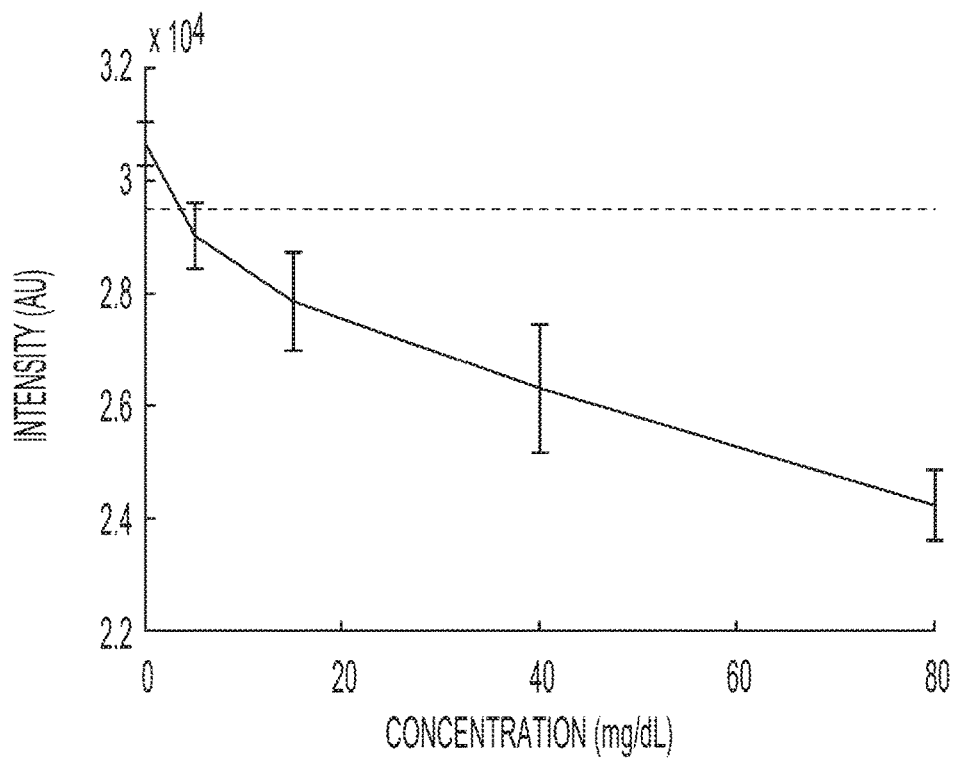
FIG. 17B is a dose-response curve generated from the scattered light spectra shown in FIG. 17A.

To validate a clinically relevant range of concentrations for the single-reagent test strips, serial dilutions of lithium acetoacetate (Sigma Aldrich) in water were prepared at concentrations of 0, 15, 40, and 80 mg/dL to match the concentrations corresponding to the reference colors. Three test strips were dipped into each of the concentrations, and each strip was allowed to dry for 40 minutes before being placed into a sample cartridge constructed as shown in FIG. 11. The sample cartridge with the test strip inside was inserted into the cartridge slot of the cradle with the smartphone attached. Spectra of scattered light from the sample pads of tests strips exposed to each concentration were obtained, as shown in FIG. 17A. A dose-response curve was created using AUC values for the 589-612 nm wavelength range, along with the standard deviation from the three test strips measured for each concentration, as shown in FIG. 17B. The Limit of Detection (LOD) was estimated to be approximately 3.5 mg/dL, which is lower than the 5 mg/dL LOD for human visual analysis via color chart comparison.

Figure 18:
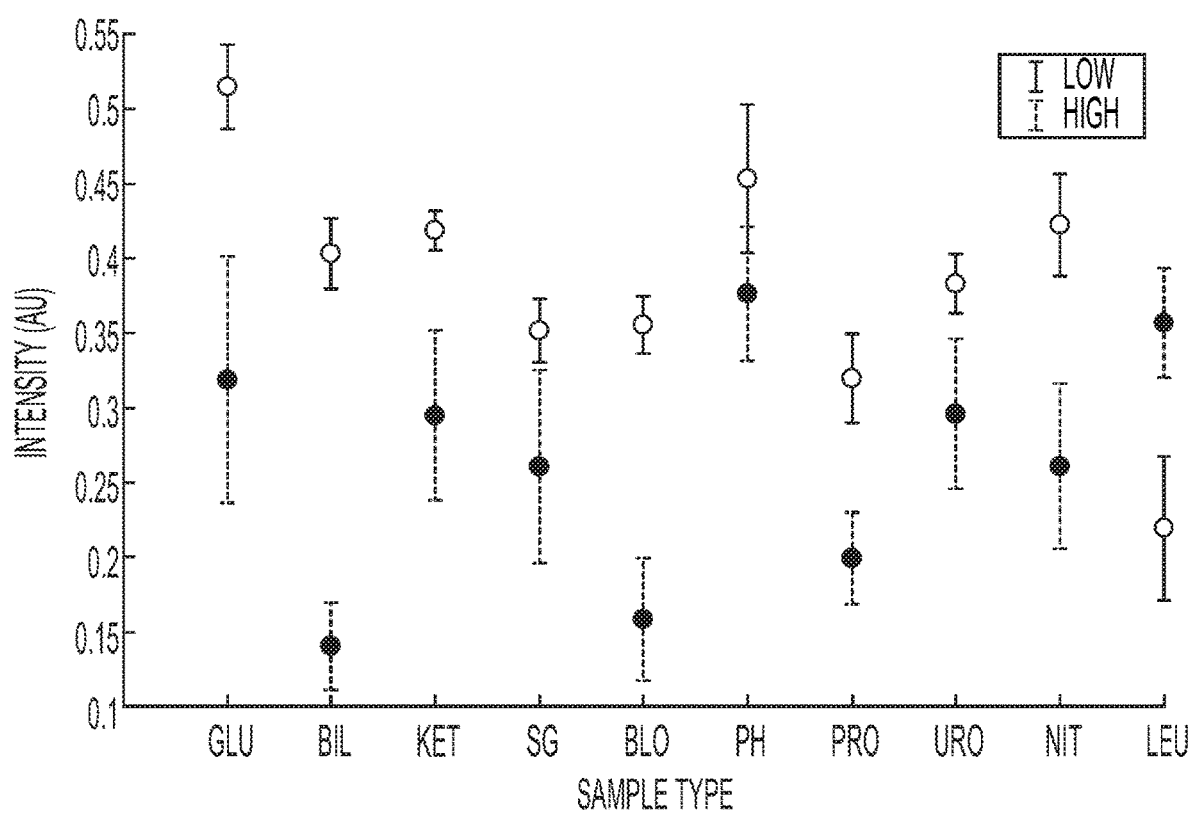
FIG. 18 shows the results of area under the curve (AUC) analysis of scattered light spectra for detection of multiple analytes/sample characteristics using multi-reagent test strips, as measured by the system shown in FIG. 1A.

The multi-reagent test strips used for validation were commercially available test strips (MooreBrand® Urine Reagent Strips 10 SG). Each test strip includes ten sample pads for detecting the following in urine: glucose (GLU); bilirubin (BIL); acetoacetic acid (KET); specific gravity (SG); blood (BLO); pH (PH); protein (PRO); urobilinogen (URO); nitrite (NIT); and leukocytes (LEU). To validate the ability to differentiate between high and low concentrations, human urine-based controls (Kova) representing normal and abnormal analyte concentrations were reconstituted in water. Three test strips were dipped into each of the concentrations and their color changes within the target read time (30 to 120 seconds) were compared to the reference colors provided with the test strips in order to estimate the relative concentrations of each analyte. After drying, each of the strips was placed in a sample cartridge constructed as shown in FIG. 12. The sample cartridge with the test strip inside was inserted into the cartridge slot of the cradle with the smartphone attached. Spectra of scattered light from the sample pads of the tests strips exposed to each concentration were obtained, and AUC values for analyte-specific regions were averaged across the three test strips. The results are shown in FIG. 18. Separation of mean values at each concentration for all analytes except specific gravity and pH were found to be statistically significant ($p<0.05$) using an unpaired two-sample t-test.

b. Transmission Mode Measurements: Fetal Fibronectin ELISA Assay

Fetal fibronectin (fFN) is a glycoprotein that has a high negative predictive value for spontaneous preterm birth. Particularly when combined with a physical measurement of the cervical length, fetal fibronectin is an important diagnostic indicator to facilitate treatment, continued monitoring, or hospital referral of at-risk mothers. While rapid lateral flow-based assays exist, they are not quantitative, and require specialized proprietary readers. Serological detection of fFN is routine in a laboratory setting, and the translation of a fFN test to a point-of-care diagnostic would provide useful information to health care providers, particularly with populations at-risk for pre-term births.

For fFN detection, a commercially available ELISA kit was purchased (CUSABIO) and used to generate standard curves, as well as measure spiked serum concentrations within physiologically relevant ranges. Kit reagents were prepared following manufacturer instructions, and reactions were completed in the included 96-well microplate. Standard concentrations were serially diluted and run in triplicate at concentrations ranging from 4 to 1000 ng/mL. Spiked plasma samples were created at a concentration of 50 ng/mL from human plasma (n=3). All samples were added to the microplate, and ELISA steps were completed per manufacturer directions. After the addition of stop solution, the samples were immediately read in a benchtop 96-well plate reader (BioTek, Synergy HT), and then transferred to a sample cartridge with a multichannel pipette.

Figure 19D:
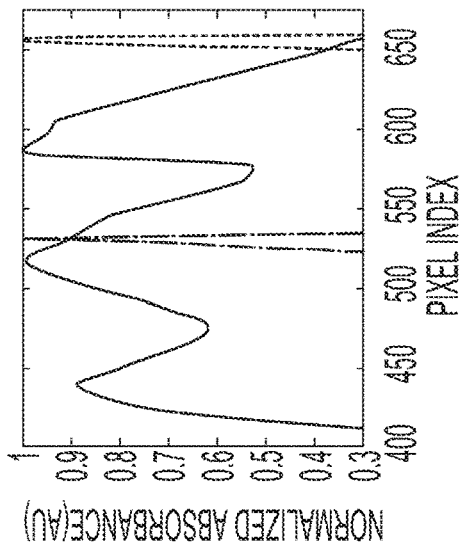
FIG. 19D illustrates the spectrum shown in FIG. 19C as a function of pixel index, along with the spectra of two laser pointers.
Figure 19C:
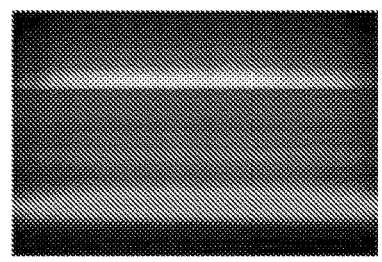
FIG. 19C is a linearized version of the example spectrum image shown in FIG. 19B.
Figure 19B:
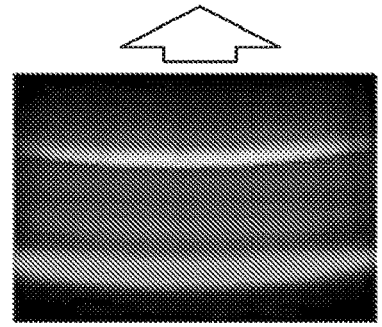
FIG. 19B is an example spectrum image obtained by a smartphone's image sensor, using the system shown in FIG. 1A.
Figure 19A:
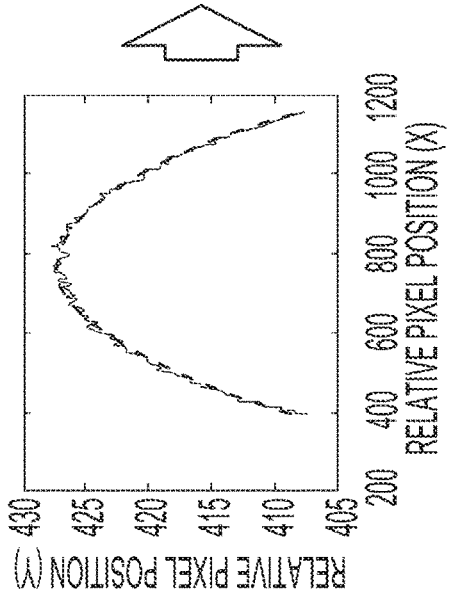
FIG. 19A shows a relationship between relative pixel positions in the X and Y directions for the spectrum image shown in FIG. 19B.

Filled cartridges were measured using the developed App to take five images of each sample as it was slid through the cartridge slot. The cylindrical lens that extends the non-spectral dimension of spectra onto the image sensor introduces spherical aberration, resulting in a curved appearance of the resultant spectrum images. This is indicated in FIG. 19A, which shows the relationship between relative pixel positions in the X and Y directions, and FIG. 19B, which shows the corresponding spectrum image obtained by the smartphone's image sensor. This curved appearance is a function of internal optics and not the alignment of the smartphone and the cradle. Thus, the curvature observed is constant throughout multiple measurements and multiple phone removals/insertions. By fitting the pixel locations of where the red filter drops off (~580 nm) in each spectral row to a circular arc, spectra can be linearized and then summed in the non-spectral dimension, as indicated by the linearized spectrum image shown in FIG. 19C. The result is a spectrum where pixel distance corresponds directly to wavelength. The relationship between pixel distance and wavelength can be interpolated from measuring light from two light sources of different, known wavelengths with the smartphone system and interpolating the wavelengths in between. In this case a laser pointer that emits at 532 nm (green) and a laser pointer that emits at 633 nm (red) were used. The resulting spectrum, along with the responses from the two laser pointers, is shown in FIG. 19D. To adjust for overall intensity variation resulting from imperfect cartridge alignment with the optical path, a linear scaling least-squares fit was performed on the spectrum above 500 nm (outside the region of interest of the chromogen absorbance) when compared to a broadband spectrum (measured with ultrapure water). The resultant normalized transmission spectra were subtracted from the same broadband spectrum, resulting in absorption spectra.

Figure 20A:
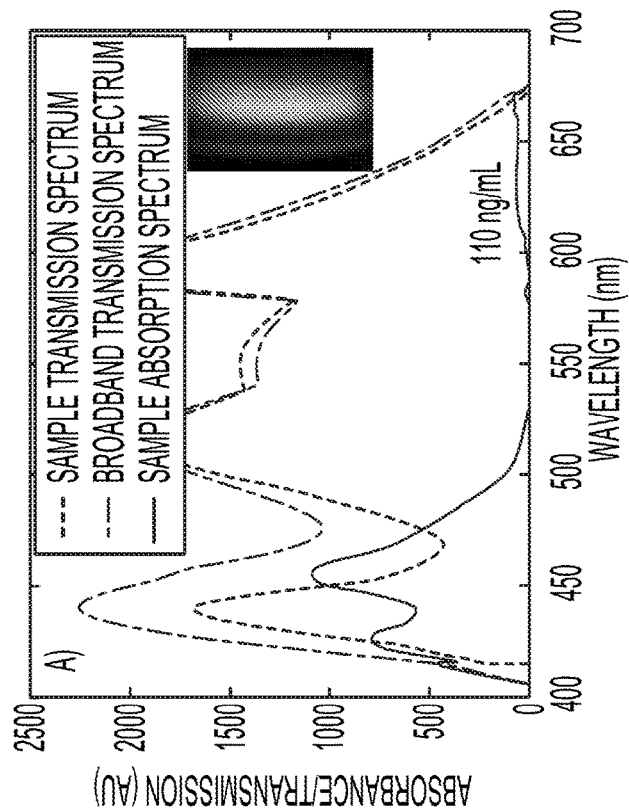
FIG. 20A shows sample transmission spectra, broadband transmission spectra, and sample absorption spectra for an ELISA assay of fetal fibronectin (fFN) obtained using the system shown in FIG. 1A.
Figure 20B:
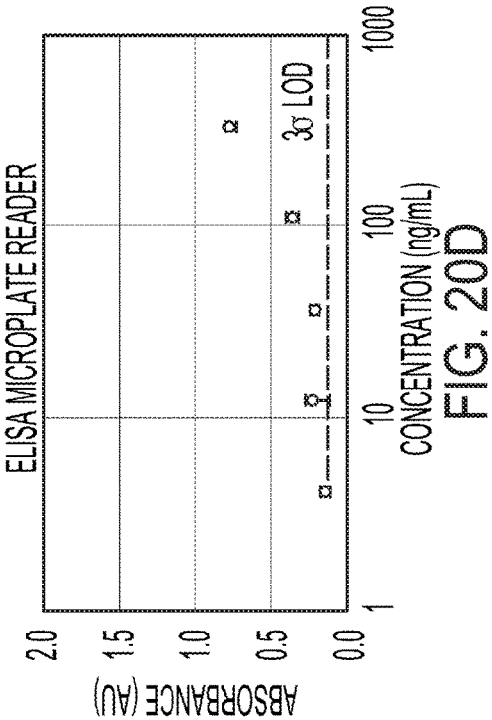
FIG. 20B shows sample transmission spectra, broadband transmission spectra, and sample absorption spectra for the ELISA assay of FIG. 20A but obtained using an 96-well microplate reader.
Figure 20C:
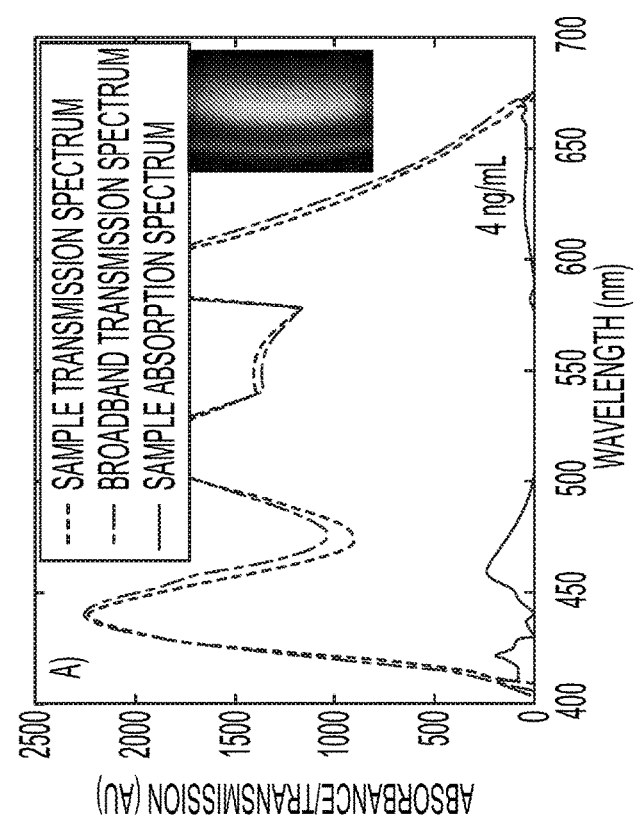
FIG. 20C is a plot of absorbance versus concentration of fFN based on the measurements shown in FIG. 20A.
Figure 20D:
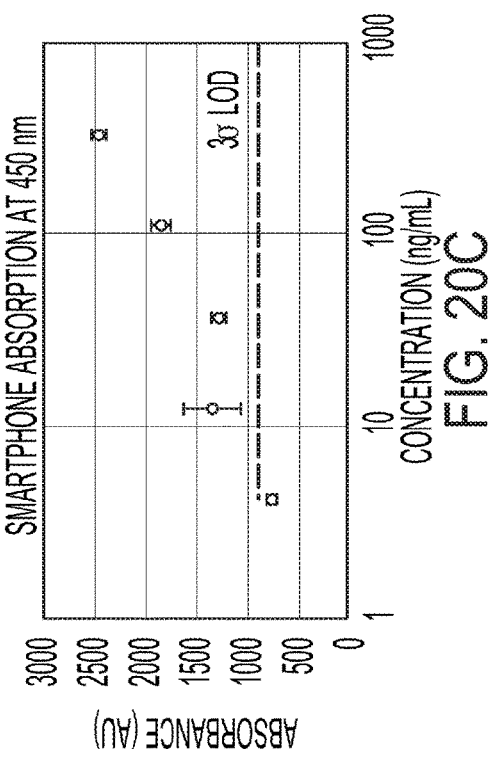
FIG. 20D is a plot of absorbance versus concentration of fFN based on the measurements shown in FIG. 20B.

FIGS. 20A and 20B show examples of sample transmission spectra, broadband transmission spectra, and sample absorption spectra obtained using the smartphone system (FIG. 20A) and the 96-well microplate reader (FIG. 20B). FIGS. 20C and 20D show the absorbance that was measured for the different concentrations using the smartphone system (FIG. 20C) and the 96-well microplate reader (FIG. 20D), with the 3σ limit of detection (LOD)) indicated for each set of measurements. Similar limits of detection were observed between the smartphone system and the 96-well microplate reader.

c. Intensity Mode Measurements: Phenylalanine Assay

Phenylalanine assays are commonly used to screen for phenylketonuria in newborns. A commercially available assay kit (Sigma Aldrich) for the quantification of human phenylalanine was used to validate the intensity mode of operation of the smartphone system described herein. A phenylalanine standard was reconstituted in water, and serially diluted to concentrations of 0.8, 0.6, 0.4, 0.2, 0.1, 0.05, and 0 nmol/well. Human serum samples were deproteinized using a 10 kDa MWCO spin filter before being diluted with assay buffer and added to wells in triplicate (n=3). The samples were pre-treated for 10 minutes at room temperature with tyrosinase to control for background interference. A sample/standard reaction mixture of developer, enzyme mix, and buffer was added to each of the wells per manufacturer directions. The solutions were allowed to incubate, covered and protected from light, for 20 minutes at 37° C. Using a commercially available 96-well microplate reader (BioTek, Synergy HT), the completed assay was measured for fluorescence, exciting at $\lambda$=535 nm and measuring at $\lambda$=587 nm. Samples were then transferred to cartridges, as described previously, and measured for fluorescence using the smartphone system described herein.

For data acquisition of the fluorescence data, an improved data collection procedure was developed. For absorption-based measurements, the stability of light output is time insensitive. With fluorescent dyes, however, both excitation intensity variation resulting from commercial laser diodes (even after circuit-based feedback control) and fluorophore photobleaching result in a time-dependence of the measurements. To mitigate these variances, a post-processing method was developed to capture data as a video as the user slides the cartridge through the cradle. By analyzing mean pixel value across each frame of the video, contiguous framesets of signal corresponding to each of the sample chambers in the cartridge could be identified, as indicated by FIG. 21A. The center 80% of these frames were averaged, and used as an image to generate a spectrum. As indicated in FIGS. 21B and 21C, an example spectrum includes a shorter-wavelength peak that corresponds to the excitation light from the laser diode and a longer-wavelength double-peak that corresponds to the fluorescence light emitted from the fluorophores in the assay in response to the excitation light from the laser diode. The integrated area of the portion of the spectrum corresponding to the fluorescence light was measured and then normalized using the integrated area of the portion of the spectrum corresponding to the excitation light from the laser diode. This normalization method was validated using Bland-Altman analysis. The resultant fluorescence spectra resulted in a clear dose-response curve with a comparable limit of detection to that of the commercially available plate reader.

Figure 22A:
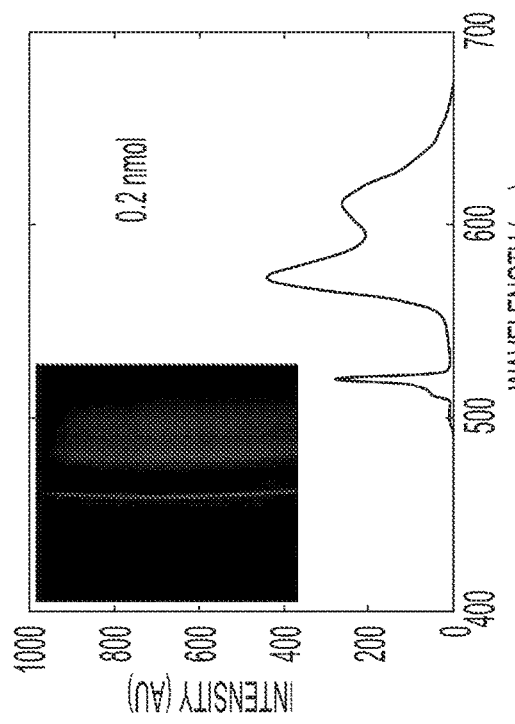
FIG. 22A shows a fluorescence spectrum for a phenylalanine assay (0.8 nmol concentration) obtained using the system shown in FIG. 1A in the intensity spectroscopy mode.
Figure 22B:
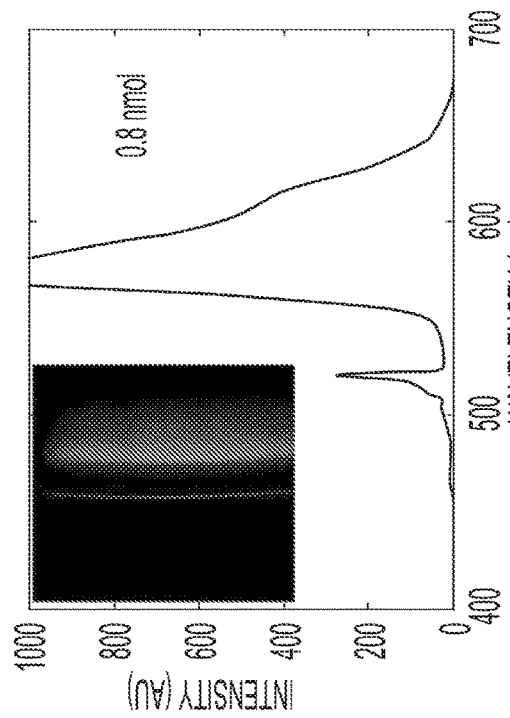
FIG. 22B shows a fluorescence spectrum for the phenylalanine assay of FIG. 22A but obtained using a fluorescence microplate reader and a different concentration (0.2 nmol concentration).
Figure 22C:
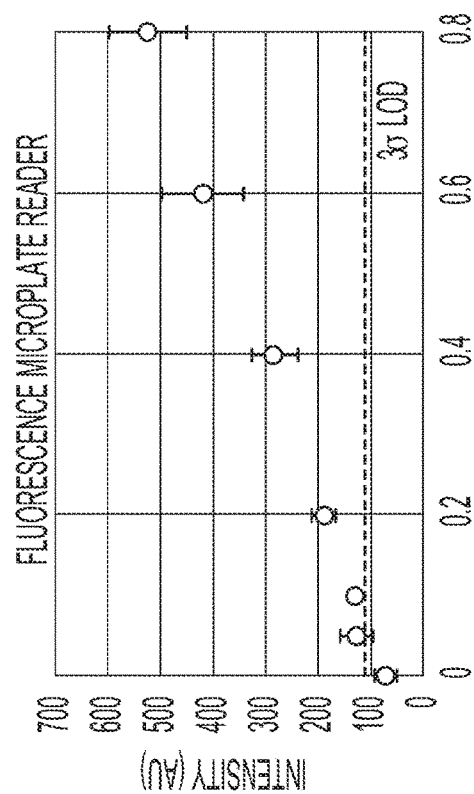
FIG. 22C is a plot of fluorescence intensity versus concentration of phenylalanine as measured by the system shown in FIG. 1A in the intensity spectroscopy mode.
Figure 22D:
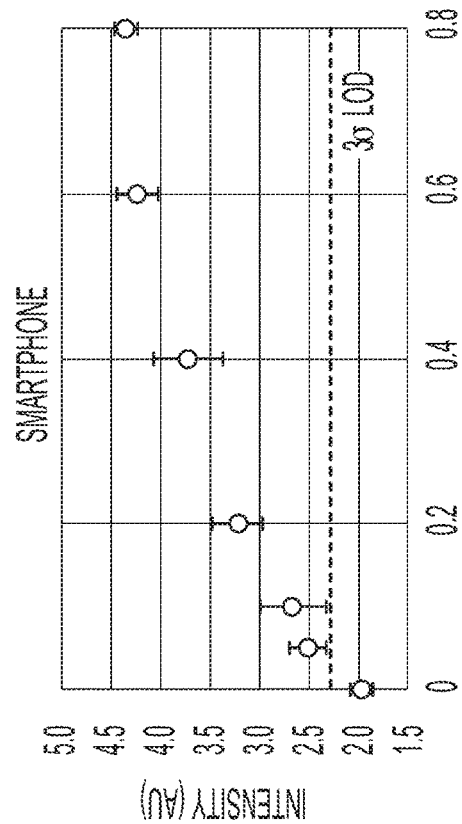
FIG. 22D is a plot of fluorescence intensity versus concentration of phenylalanine as measured by the fluorescence microplate reader.

FIG. 22A shows a spectrum obtained using the smartphone system for the 0.8 nmol concentration. FIG. 22B shows a spectrum obtained using the microplate reader for the 0.2 nmol concentration. FIG. 22C is a plot of fluorescence intensity versus concentration of phenylalanine using the smartphone system. FIG. 22D is a plot of fluorescence intensity versus concentration of phenylalanine using the microplate reader. The 3σ limit of detection (LOD) is indicated for each set of measurements. The limit of detection for the smartphone-based system was less than the lowest assayed concentration (0.05 nmol), while the limit of detection for the microplate reader was between 0.05 nmol and 0.1 nmol. The measurements obtained using the smartphone system appeared to saturate at higher concentrations, indicating that the smartphone system may have a lower dynamic range than the microplate reader.

d. Scattered Light Measurements: pH and Glucose

Figure 23A:
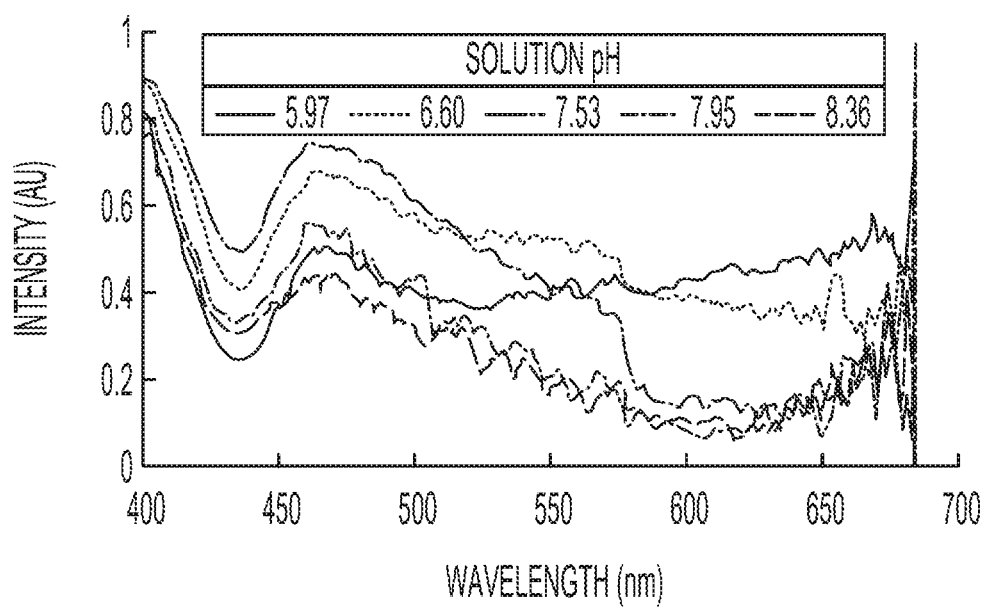
FIG. 23A illustrates scattered light spectra for detection of pH using the pH detection pads of multi-reagent test strips, as measured by the system shown in FIG. 1A.
Figure 23B:
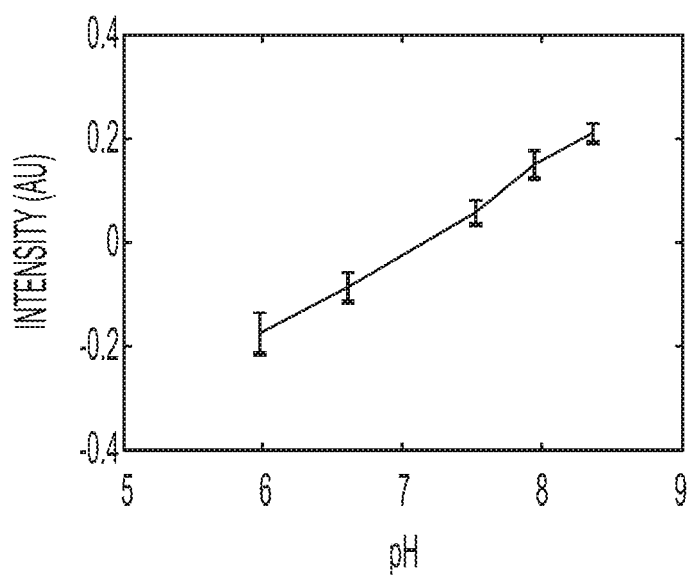
FIG. 23B is a dose-response curve generated from the scattered light spectra shown in FIG. 23A.

The pH (pH) and glucose (GLU) sample pads of the multi-reagent test strips used for the validation studies described above were further evaluated for dose-response characterizations. For the pH measurements, five calibration solutions with pH values ranging from 6.0 to 8.4 were created by adding $NaHCO_3$ to the normal urine control solution. The pH values of the calibration solutions were measured using a benchtop pH meter (Thermo, Orion 4-Star). Three strips were dipped into each of the calibration solutions and their color changes at the target reading time of 60 seconds were compared to the reference colors provided with the test strips. After drying, the strips were placed in sample cartridges and inserted in the apparatus to obtain spectral profiles. The spectral profiles for each calibration solution were averaged together. The resulting spectra are illustrated in FIG. 23A. The pH detection pads in these test strips include a dual-indicator system in which color changes are caused by methyl red with an active the range of pH 4.4 to 6.2 and by bromothymol blue with an active range of pH 6.0 to 7.6. Higher pH values (in the 7.5 to 8.4 range) were visually indistinguishable but could be distinguished spectrally by a significant decrease in the scattering of red wavelengths. As such, two portions of the resulting scattered light spectra were selected for AUC analysis. The 460-470 nm wavelength range was used for AUC analysis of all calibration solutions. For calibration solutions with pH greater than 7, an additional wavelength range of 630-640 nm was also used for AUC analysis. The resulting calibration curve for these calibration solutions is shown in FIG. 23B. As shown, the AUC intensity variation is fairly linear over this range of pH values (6.0 to 8.4). The ability to differentiate between readings that appear to be nearly identical to the human eye demonstrates the value of scattered light spectral analysis over the conventional approach of human eye comparisons with reference colors.

Figure 24A:
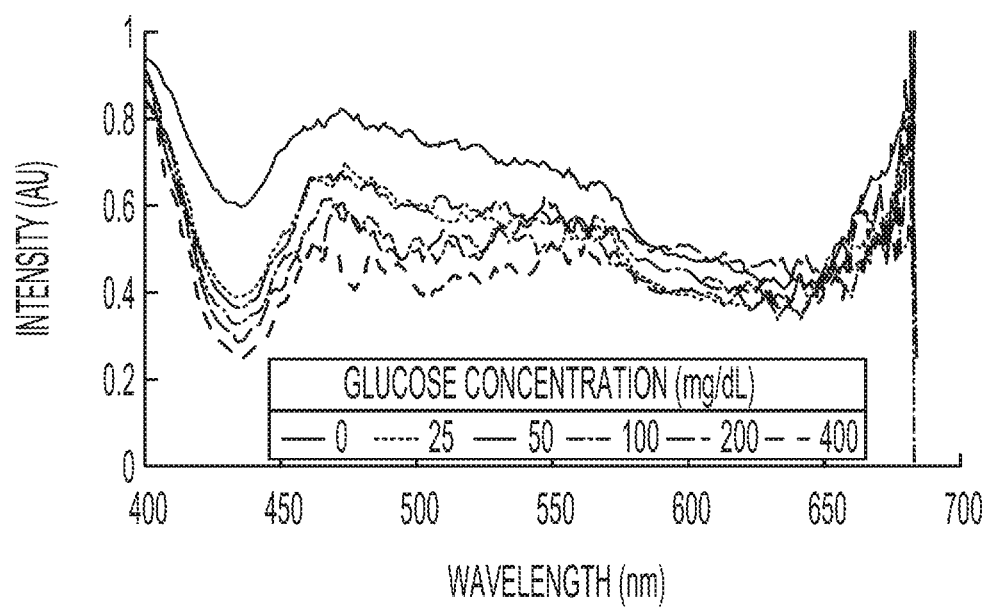
FIG. 24A illustrates scattered light spectra for detection of glucose using the glucose detection pads of multi-reagent test strips, as measured by the system shown in FIG. 1A.
Figure 24B:
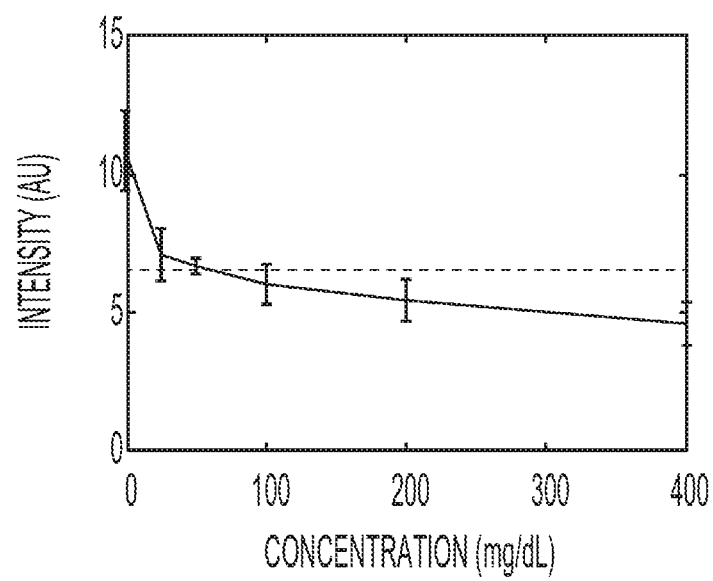
FIG. 24B is a dose-response curve generated from the scattered light spectra shown in FIG. 24A.

The validation of the multi-reagent test strips described above demonstrated the ability of scattered light measurements using the apparatus to distinguish between high and low concentrations of glucose. A further quantitative study of the glucose detection pads of the multi-reagent test strips was performed. Calibration solutions were prepared at concentrations of 0, 25, 50, 100, 200, and 400 mg/dL by serial dilutions of glucose in normal control urine solution. Since the glucose concentration of the original control solution was known only to be under 100 mg/dL, these concentrations represent only the known added amount of glucose. Three strips were dipped into each of the concentrations, and their color changes at 15 seconds after sample application were visually compared to the reference colors provided with the test strips. After drying, the strips were placed in sample cartridges and inserted in the apparatus to obtain spectral profiles. The spectral profiles for each calibration solution were averaged together. The resulting spectra are illustrated in FIG. 24A. A dose-response curve was created using mean AUC values for the 430-440 nm wavelength range along with standard deviation for each of the three trials. The resulting does-response curve is shown in FIG. 24B. The limit of detection (LOD) was estimated to be approximately 60 mgidL, which is lower than the 100 mg/dL LOD for human visual analysis via color chart comparison.

6. Conclusion

The multimode smartphone-based system described herein demonstrates both the breadth of IVD assay possibilities and applications that can be achieved within a single instrument. Each of the modalities offers up a wide array of existing assays that have been developed for the laboratory setting that can be rapidly translated to be used with such a POCT device. The described embodiments can make use of both the rapid improvements to smartphone hardware and software as well as the significant improvements in resolution and affordability of SLA-based 3D printing. For example, 3D-printed optical mounts could augment or even replace conventional benchtop optical assembly and alignment. In particular, within the realm of optical biosensors designed for the point-of-care, this presents significant potential to create new optical systems that can proceed from computer simulation directly to handheld prototype.

The disclosed embodiments also provide a rapid-prototype-friendly method for micro- and milli-fluidic cartridges for use with mobile biosensing devices. The linear arrangement of fluid chambers in multi-sample cartridges supports multiplexing that can be useful both for assays requiring multiple standards or controls, or situations where many samples might be run at once. The use of laser-cut acrylic sheet and DSA assembly opens the door for a myriad of other possible cartridge configurations, including increasing the number of sample chambers per cartridge for further multiplexing, or incorporating other microfluidic assay steps such as sample lysis, mixing, or other mainstays of micro-fluidic-chip based technology.

The smartphone-bases system can be used with commercial assays to facilitate transfer of laboratory-grade tests to the point-of-care. For example, the system can use kits that rely on optical readout of sandwich immunoassays with either absorbance or fluorescence-based reporting molecules (ELISA, FIA, CLIA), and many new assays that are being developed based upon other novel techniques, including those using bioluminescence, SPR, PCs or other selective-resonance phenomena.

Video-based capture of sample signals is also supported by the linear cartridges, further simplifying multi-analyte multiplexing into a more user-friendly interface. The developed image processing holds potential for further expansion into future devices that can take advantage of such a 'swipe' based interface. The swiping of a credit card is a ubiquitous motion that readily simplifies multiplexed sample measurements compared to those in a typical cuvette-based measurement system.

The results from the fFN and phenylalanine assays demonstrate that the smartphone-based system can replicate the sensitivity of conventional benchtop laboratory instruments. In both assays, the smartphone-based system could detect concentrations of assayed analyte less than those detected on a conventional laboratory instrument, albeit with a possible decrease in dynamic range. In the fFN assay, near-complete absorption of light at 450 nm at high concentrations resulted in signal saturation. For this particular assay, this would likely be acceptable as threshold ranges from literature range from 10-200 ng/mL. Similarly, in the phenylalanine assay, the smartphone-based system did not produce a linear dose-response curve, instead demonstrating a saturation-curve relationship at higher concentrations. However, using a 4-parameter logistic growth curve instead of a linear fit may allow for appropriate unknown concentrations to be determined using the smartphone-based system. Bland-Altman analysis demonstrated agreement for both assays at all concentrations, suggesting that the disclosed smartphone-based system can successfully reproduce the expected assay measurements from identical samples.

What is claimed is:

1. An apparatus, comprising:
a structural support comprising a mount and a cartridge slot, wherein the mount is configured to removably mount a mobile computing device in a working position, wherein the mobile computing device includes a first light source and an image sensor, and wherein the cartridge slot comprises a reflective slot surface and is configured to receive a plurality of different types of sample cartridges;
a wavelength-dispersive element coupled to the structural support such that the wavelength-dispersive element is optically coupled to the image sensor when the mobile computing device is in the working position;
a first optical fiber having a proximal end and a distal end, wherein the first optical fiber is coupled to the structural support such that the proximal end of the first optical fiber is optically coupled to the cartridge slot via a first illumination optical path and the distal end of the first optical fiber is able to receive light from the first light source when the mobile computing device is in the working position;
a second optical fiber having a proximal end and a distal end, wherein the second optical fiber is coupled to the structural support such that the proximal end of the second optical fiber is optically coupled to the cartridge slot via a collection optical path that is substantially parallel to the first illumination optical path and the distal end of the second optical fiber is able to direct light to the image sensor via the wavelength-dispersive element when the mobile computing device is in the working position;
a second light source coupled to the structural support such that the second light source is optically coupled to the cartridge slot via a second illumination optical path, wherein the second illumination optical path is substantially orthogonal to the collection optical path;

an optical system, wherein the optical system is adjustable between:
  (i) a collimated configuration in which the optical system collimates light from the first light source transmitted through the proximal end of the first optical fiber, directs the collimated light toward the cartridge slot, and couples reflected collimated light into the proximal end of the second optical fiber; and
  (ii) a focused configuration in which the optical system collects light from a focal region within the cartridge slot and couples the collected light into the proximal end of the second optical fiber; and wherein the apparatus is operable in at least a transmission spectroscopy mode, a reflection spectroscopy mode, an intensity spectroscopy mode, and a scattered light spectroscopy mode.

2. The apparatus of claim 1, wherein the mobile computing device is a smartphone.

3. The apparatus of claim 1, wherein the first light source is a light emitting diode (LED).

4. The apparatus of claim 3, wherein the first light source is a white-light LED.

5. The apparatus of claim 1, wherein the wavelength-dispersive element comprises a diffraction grating.

6. The apparatus of claim 1, wherein the second light source comprises a laser diode.

7. The apparatus of claim 1, wherein the proximal end of the first optical fiber is positioned adjacent the proximal end of the second optical fiber within an alignment sleeve.

8. The apparatus of claim 7, wherein first and second optical fibers are substantially parallel within the alignment sleeve.

9. The apparatus of claim 8, wherein the alignment sleeve comprises a glass capillary.

10. The apparatus of claim 1, wherein the optical system comprises a first lens and a second lens, wherein the first lens but not the second lens is disposed in the first illumination optical path and the collection optical path when the optical system is in the collimated configuration, and wherein the both the first lens and the second lens are disposed in the collection optical path when the optical system is in the focused configuration.

11. The apparatus of claim 1, wherein the transmission spectroscopy mode provides for transmission spectroscopy of a sample in a first type of sample cartridge, wherein the first type of sample cartridge comprises a transparent front surface, a transparent back surface opposite the transparent front surface, and a sample chamber between the transparent front surface and the transparent back surface, wherein the sample is disposed in the sample chamber.

12. The apparatus of claim 11, wherein the first mode of operation is characterized by:
  the first type of sample cartridge being disposed in the cartridge slot such that the transparent back surface covers the reflective slot surface and the first illumination path and the collection optical path extend through the transparent front surface; and
  the optical system being in the collimated configuration, wherein collimated light from the optical system enters the sample chamber through the transparent front surface, passes through the sample disposed in the sample chamber, passes through the transparent back surface, and reflects from the reflective slot surface as reflected collimated light, and
  wherein the reflected collimated light enters the sample chamber through the transparent back surface, passes through the sample disposed in the sample chamber, passes through the transparent front surface, and is coupled into the proximal end of the second optical fiber by the optical system.

13. The apparatus of claim 1, wherein the reflection spectroscopy mode provides for reflection spectroscopy of a sample in a second type of sample cartridge, wherein the second type of sample cartridge comprises a transparent front surface, a reflective back surface opposite the transparent front surface, and a sample chamber between the transparent front surface and the reflective back surface, wherein the sample is disposed in the sample chamber.

14. The apparatus of claim 13, wherein the reflection spectroscopy mode is characterized by:
  the second type of sample cartridge being disposed in the cartridge slot such that the reflective back surface covers the reflective slot surface and the first illumination and the collection optical path extend through the transparent front surface; and
  the optical system being in the collimated configuration, wherein collimated light from the optical system enters the sample chamber through the transparent front surface, passes through the sample disposed in the sample chamber, and reflects from the reflective back surface as reflected collimated light, and
  wherein the reflected collimated light passes through the sample disposed in the sample chamber, passes through the transparent front surface, and is coupled into the proximal end of the second optical fiber by the optical system.

15. The apparatus of claim 1, wherein the intensity spectroscopy mode provides for intensity spectroscopy of a sample in a third type of sample cartridge, wherein the third type of sample cartridge comprises a transparent front surface, a transparent back surface opposite the transparent front surface, a transparent bottom surface orthogonal to the transparent front surface, and a sample chamber between the transparent front surface and the transparent back surface, wherein the sample is disposed in the sample chamber.

16. The apparatus of claim 15, wherein the intensity spectroscopy mode is characterized by:
  the third type of sample cartridge being disposed in the cartridge slot such that the collection optical path extends through the transparent front surface and the second illumination optical path extends through the transparent bottom surface; and
  the optical system being in the focused configuration with the focal region located within the sample disposed in the sample chamber,
  wherein excitation light from the second light source enters the sample chamber through the transparent bottom surface, passes through the sample disposed in the sample chamber, and causes fluorophores present in the sample to emit fluorescence light, and
  wherein the optical system collects fluorescence light emitted from the sample in the focal region and couples the collected fluorescence light into the proximal end of the second optical fiber.

17. The apparatus of claim 1, wherein the scattered light spectroscopy mode provides for scattered light spectroscopy of a sample applied to a sample pad of a test strip contained in a fourth type of sample cartridge, wherein the fourth type of sample cartridge comprises a front surface with a window formed therein, a back surface opposite the front surface, and a sample chamber between the front surface and the transparent back surface, wherein the test strip is disposed in the sample chamber such that the sample pad is aligned with the window.

18. The apparatus of claim 17, wherein the scattered light spectroscopy mode is characterized by:
the fourth type of sample cartridge being disposed in the cartridge slot such that the back surface covers the reflective slot surface and the first illumination and the collection optical path extend through the window in the front surface; and
the optical system being in the focused configuration to focus on the sample pad of the test strip disposed in the sample chamber,
wherein focused light from the optical system enters the sample chamber through the window of the front surface and illuminates the sample pad, wherein the sample pad scatters a portion of the focused light to provide scattered light, and wherein a portion of the scattered light passes through the window, and
wherein the optical system collects scattered light from the sample pad that passes through the window and couples the collected scattered light into the proximal end of the second optical fiber.

19. The apparatus of claim 1, wherein the wavelength-dispersive element is configured to disperse light into wavelength components that are spatially separated in a spectral dimension, such that different wavelength components are received at different locations on the image sensor when the mobile computing device is in the working position.

20. The apparatus of claim 19, further comprising an aspheric lens and a cylindrical lens between the distal end of the second optical fiber and the wavelength-dispersive element, wherein the aspheric lens collimates light emitted from the distal end of the second optical fiber, and wherein the cylindrical lens focuses the collimated light in a non-spectral dimension, wherein the non-spectral dimension is substantially perpendicular to the spectral dimension.

21. A method, comprising:
mounting a mobile computing device to an apparatus, wherein the mobile computing device includes a light source and an image sensor, and wherein mounting the mobile computing device to the apparatus comprises optically coupling the light source to a distal end of a first optical fiber in the apparatus and optically coupling the image sensor to a wavelength-dispersive element in the apparatus, wherein the wavelength-dispersive element is optically coupled to a distal end of a second optical fiber in the apparatus;
moving a sample cartridge through a cartridge slot of the apparatus in a swiping motion, wherein the sample cartridge contains a plurality of samples disposed at a plurality of sample locations arranged in a linear sequence and includes delimiting structures that delimit the sample locations in the linear sequence, wherein the cartridge slot comprises a reflective slot surface, and wherein the cartridge slot is (i) optically coupled to a proximal end of the first optical fiber via a first illumination optical path, (ii) optically coupled to a proximal end of the second optical fiber via a collection optical path that is substantially parallel to the first illumination optical path, and (iii) optically coupled to a second light source via a second illumination optical path that is substantially orthogonal to the collection optical path;
selecting a mode of operation from among at least a transmission spectroscopy mode, a reflection spectroscopy mode, an intensity spectroscopy mode, and a scattered light spectroscopy mode;
directing incident light into the samples disposed in the sample cartridge as the sample cartridge moves through the cartridge slot in the swiping motion, wherein the incident light is from at least one of the first light source or the second light source, depending on the selected mode of operation;
collecting, by an optical system, light from the samples disposed in the sample cartridge as the sample cartridge moves through the cartridge slot in the swiping motion, wherein the optical system couples the collected light into the proximal end of the second optical fiber;
receiving at the wavelength-dispersive element, via the second optical fiber, the light collected by the optical system, wherein the wavelength-dispersive element disperses the received light into spatially-separated wavelength components on the image sensor; and
using the image sensor to capture video as the sample cartridge moves through the cartridge slot in the swiping motion, wherein the video comprises a time-sequence of images that includes a plurality of dark images corresponding to images of delimiting structures in the sample cartridge and a plurality of bright images corresponding to images of sample locations in the sample cartridge.

22. The method of claim 21, wherein the selected mode of operation is the transmission spectroscopy mode, and wherein the sample cartridge comprises a transparent front surface and a transparent back surface opposite the transparent front surface, and wherein the samples are disposed in sample chambers between the transparent front surface and the transparent back surface.

23. The method of claim 22, wherein directing incident light into the samples disposed in the sample cartridge as the sample cartridge moves through the cartridge slot in the swiping motion comprises:
directing, via the first optical fiber, light from the first light source to the optical system, wherein the optical system collimates the light from the first light source and directs the collimated light into the samples via the transparent front surface,
wherein the collimated light passes through the samples disposed in the sample chambers, passes through the transparent back surface, and reflects from the reflective slot surface as reflected collimated light, and
wherein the reflected collimated light enters the sample chambers through the transparent back surface, passes through the samples disposed in the sample chambers, and passes through the transparent front surface, and
wherein collecting light from the samples disposed in the sample cartridge comprises:
collecting, by the optical system, at least a portion of the reflected collimated light that passes through the transparent front surface.

24. The method of claim 21, wherein the selected mode of operation is the reflection spectroscopy mode, and wherein the sample cartridge comprises a transparent front surface and a reflective back surface opposite the transparent front surface, and wherein the samples are disposed in sample chambers between the transparent front surface and the reflective back surface.

25. The method of claim 24, wherein directing incident light into the samples disposed in the sample cartridge as the sample cartridge moves through the cartridge slot in the swiping motion comprises:
directing, via the first optical fiber, light from the first light source to the optical system, wherein the optical system collimates the light from the first light source and directs the collimated light into the samples via the transparent front surface, wherein the collimated light passes through the samples disposed in the sample chambers, and reflects from the reflective slot surface as reflected collimated light, and wherein the reflected collimated light passes through the samples disposed in the sample chambers, passes through the transparent front surface, and wherein collecting light from the samples disposed in the sample cartridge comprises:

collecting, by the optical system, at least a portion of the reflected collimated light that passes through the transparent front surface.

26. The method of claim 21, wherein the selected mode of operation is the intensity spectroscopy mode, and wherein the sample cartridge comprises a transparent front surface, a transparent back surface opposite the transparent front surface, and a transparent bottom surface orthogonal to the transparent front surface, and wherein the samples are disposed in sample chambers between the transparent front surface and the transparent back surface.

27. The method of claim 26, wherein directing incident light into the samples disposed in the sample cartridge as the sample cartridge moves through the cartridge slot in the swiping motion comprises:

directing excitation light from the second light source into the samples via the transparent bottom surface, wherein the excitation light passes through the samples disposed in the sample chambers and causes fluorophores present in the samples to emit fluorescence light, wherein at least a portion of the emitted fluorescence light passes through the transparent front surface, and wherein collecting light from the samples disposed in the sample cartridge comprises:

collecting, by the optical system, at least a portion of the fluorescence light that passes through the transparent front surface.

28. The method of claim 21, wherein the selected mode of operation is the scattered light spectroscopy mode, and wherein the sample cartridge comprises a front surface with a plurality of windows formed therein, a back surface opposite the front surface, and a sample chamber between the transparent front surface and the transparent back surface, and wherein the samples are applied to sample pads of a test strip disposed in the sample chamber such that the sample pads are aligned with the windows.

29. The method of claim 28, wherein directing incident light into the samples disposed in the sample cartridge as the sample cartridge moves through the cartridge slot in the swiping motion comprises:

directing, via the first optical fiber, light from the first light source to the optical system, wherein the optical system focuses the light from the first light source onto the sample pads through the windows in the front surface, wherein the sample pads scatter a portion of the light from the first light source to provide scattered light, and a portion of the scattered light from the sample pads passes through the window, and wherein collecting light from the samples disposed in the sample cartridge comprises:

collecting, by the optical system, scattered light from the sample pads that passes through the windows.

30. The method of claim 21, further comprising:

for a particular sample location in the plurality of sample locations, identifying at least one bright image as corresponding to the particular sample location based on a position of the at least one bright image in the time-sequence of images relative to (i) at least one dark image occurring before the at least one bright image in the time-sequence of images and (ii) at least one dark image occurring after the at least one bright image in the time-sequence of images; and using the at least one bright image to determine a spectral characteristic of a particular sample disposed at the particular sample location.

\* \* \* \* \*